United States Patent
Hoshino

(10) Patent No.: US 8,431,664 B2
(45) Date of Patent: Apr. 30, 2013

(54) COPOLYMER, METHOD FOR ITS PRODUCTION, OIL REPELLENT COMPOSITION AND ARTICLE TREATED THEREWITH

(75) Inventor: Taiki Hoshino, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 92 days.

(21) Appl. No.: 12/958,013

(22) Filed: Dec. 1, 2010

(65) Prior Publication Data

US 2011/0077349 A1    Mar. 31, 2011

Related U.S. Application Data

(63) Continuation of application No. PCT/JP2009/060010, filed on Jun. 1, 2009.

(30) Foreign Application Priority Data

Jun. 2, 2008 (JP) ................................. 2008-145056

(51) Int. Cl.
*C08F 18/20* (2006.01)

(52) U.S. Cl.
USPC ........ 526/245; 526/303.1; 526/310; 526/320; 428/421

(58) Field of Classification Search .............. 526/245, 526/303.1, 310
See application file for complete search history.

(56) References Cited

U.S. PATENT DOCUMENTS

| | | | | |
|---|---|---|---|---|
| 3,857,818 A * | 12/1974 | Frizelle | ........................ | 525/124 |
| 4,564,561 A * | 1/1986 | Lore et al. | ..................... | 428/422 |
| 6,177,531 B1 * | 1/2001 | Shimada et al. | ............. | 526/245 |
| 6,479,605 B1 * | 11/2002 | Franchina | .................... | 526/245 |
| 6,500,439 B1 * | 12/2002 | Morita et al. | ................. | 424/401 |
| 6,716,944 B2 | 4/2004 | Maekawa et al. | | |
| 2003/0130457 A1 | 7/2003 | Maekawa et al. | | |
| 2005/0267241 A1 | 12/2005 | Sugimoto et al. | | |
| 2007/0293654 A1 | 12/2007 | Kashiwagi | | |
| 2008/0076862 A1 | 3/2008 | Sugimoto et al. | | |
| 2010/0069565 A1 * | 3/2010 | Hara et al. | ..................... | 524/544 |

FOREIGN PATENT DOCUMENTS

| | | |
|---|---|---|
| JP | 63-075082 | 4/1988 |
| JP | 7-188339 | 7/1995 |
| JP | 2002-256130 | 9/2002 |
| WO | 02/083809 | 10/2002 |
| WO | 2004/035708 | 4/2004 |
| WO | 2006/022122 | 3/2006 |
| WO | 2004/035708 | 4/2007 |
| WO | WO 2008022985 A1 * | 2/2008 |
| WO | WO 2008143299 A1 * | 11/2008 |
| WO | 2008/153075 | 12/2008 |

OTHER PUBLICATIONS

International Search Report issued Sep. 1, 2009 in PCT/JP09/060010 filed Jun. 1, 2009.

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

A copolymer is provided which is capable of providing an article surface with sufficient oil repellency against oils having low surface tensions and which places little burden on the environment. Further, a method for producing such a copolymer, an oil repellent composition containing such a copolymer as an effective component, and an article which is excellent in oil repellency against oils having low surface tensions and which contains no material having high environmental burden, are provided. A copolymer comprising the following polymerized units (a), polymerized units (b), polymerized units (c1) and polymerized units (c2), and an oil repellent composition and article containing it. (a) is polymerized units based on a monomer such as a (meth)acrylate having $R^1$, (b) is polymerized units based on a $C_{6-18}$ alkyl (meth)acrylate, (c1) is polymerized units based on a monomer having a hydroxy group, and (c2) is polymerized units based on a monomer having a functional group reactive with the hydroxy group in (c1) to form a crosslinked structure.

11 Claims, No Drawings

COPOLYMER, METHOD FOR ITS PRODUCTION, OIL REPELLENT COMPOSITION AND ARTICLE TREATED THEREWITH

TECHNICAL FIELD

The present invention relates to a copolymer, a method for its production, an oil repellent composition containing such a copolymer, and an article treated with such an oil repellent composition.

BACKGROUND ART

As a technique for imparting water repellency and oil repellency at the same time to a surface of an article, it has been common to treat the article with an organic solvent solution or an aqueous dispersion of a polymer containing polymerized units of a polymerizable monomer containing a polyfluoroalkyl group (a group having a structure wherein at least two and at most all of hydrogen atoms in an alkyl group are substituted by fluorine atoms, such a polyfluoroalkyl group will hereinafter be referred to as an "$R^f$ group") in its molecule or a copolymer of such a polymerizable monomer with other monomers.

The development of such water and oil repellency is attributable to formation of "a surface having a low surface energy" where the critical surface tension is low, which is formed on the surface of the coating film by a surface orientation of $R^f$ groups. It has been considered that in order to develop both water repellency and oil repellency, the orientation of $R^f$ groups on the surface is important, and in order to realize the surface orientation of $R^f$ groups, it is necessary for the polymer to have structural units based on a monomer having a perfluoroalkyl group (a group having a structure wherein all hydrogen atoms in an alkyl group are substituted by fluorine atoms, such a perfluoroalkyl group will hereinafter be referred to as an "$R^F$ group") having at least 8 carbon atoms.

However, recently, EPA (United States Environmental Protection Agency) has pointed out that a compound having an $R^F$ group having at least 8 carbon atoms is decomposed in an environment or a living body and its decomposition product is accumulated there, thus bringing about a high environmental burden. Accordingly, a copolymer for a water/oil repellent composition having structural units based on a monomer having an $R^F$ group having at most 6 carbon atoms and containing no structural units based on a monomer having an $R^F$ group having at least 8 carbon atoms, is required.

As such water/oil repellent compositions, a water/oil repellent composition containing, as an effective component, a copolymer comprising polymerized units based on a monomer having an $R^f$ group (preferably an $R^F$ group having at most 6 carbon atoms) with a low melting point of fine crystals and polymerized units based on a monomer having no $R^f$ group with a high melting point of fine crystals (Patent Document 1), and a water/oil repellent composition containing, as an effective component, a compound comprising polymerized units based on a monomer having an $R^f$ group (preferably an $R^F$ group having at most 6 carbon atoms) having a glass transition point of at least a certain temperature with a low melting point of fine crystals and polymerized units based on a monomer having a crosslinkable functional group without having an $R^f$ group (Patent Document 2) are known.

However, each of these water/oil repellent compositions is one for the purposes of (1) imparting water and oil repellency to an article by treatment even at a low temperature, (2) enabling water and oil repellent processing to provide soft texture and (3) enabling water and oil repellent processing to provide excellent durability, and has a problem such that the oil repellency is not sufficient although the water repellency and its durability are excellent.

Further, with respect to a copolymer having structural units based on a monomer having an $R^f$ group having at most 6 carbon atoms, one capable of exhibiting sufficient oil repellency against oils having low surface tensions, such as gasoline or a hydrocarbon liquid with a low surface tension, has not been known.

PRIOR ART DOCUMENTS

Patent Documents

Patent Document 1: WO02/083809
Patent Document 2: WO04/035708

SUMMARY OF THE INVENTION

Objects to be Accomplished by the Invention

The present invention has an object to provide a copolymer which is capable of providing an article surface with sufficient oil repellency against oils having low surface tensions and which places little burden on the environment, in place of a copolymer having an $R^F$ group with at least 8 carbon atoms which places a high burden on the environment although it is excellent in oil repellency. The present invention further has an object to provide a method for producing such a copolymer, an oil repellent composition containing such a copolymer as an effective component, and an article which is excellent in oil repellency against oils having low surface tensions.

Means to Accomplish the Objects

The present invention provides a copolymer comprising the following polymerized units (a), polymerized units (b), polymerized units (c1) and polymerized units (c2):

Polymerized units (a): polymerized units based on a monomer represented by the following formula (1):

$$Z-Y-X \qquad (1)$$

(in the formula (1), Z is a $C_{4-6}$ polyfluoroalkyl group or a group represented by the following formula (2), Y is a bivalent organic group or a single bond, and X is any one of groups represented by the following formulae (3-1) to (3-5):

$$C_iF_{2i+1}O(CFX^1CF_2O)_jCFX^2- \qquad (2)$$

(wherein i is an integer of from 1 to 6, j is an integer of from 0 to 10, and each of $X^1$ and $X^2$ is a fluorine atom or a trifluoromethyl group),

$$-CR=CH_2 \qquad (3-1)$$

$$-C(O)OCR=CH_2 \qquad (3-2)$$

$$-OC(O)CR=CH_2 \qquad (3-3)$$

$$-OCH_2\text{-}\phi\text{-}CR=CH_2 \qquad (3-4)$$

$$-OCH=CH_2 \qquad (3-5)$$

(wherein R is a hydrogen atom, a methyl group or a halogen atom, and φ is a phenylene group), Polymerized units (b): polymerized units based on a linear or branched alkyl (meth)acrylate wherein the alkyl moiety has from 6 to 18 carbon atoms, (provided that when in the polymerized units (a), X in the formula (1) is a group represented by any one of the formulae (3-1) to (3-4) wherein R is a group being a methyl group or a halogen atom, the polymerized units (b) are polymerized units based on an alkyl acrylate, and when in the polymerized units (a), X in the formula (1) is a group represented by any one of the formulae (3-1) to (3-4) wherein R is a group being a hydrogen atom, or a group represented by the formula (3-5), the polymerized units (b) are polymerized units based on an alkyl methacrylate), Polymerized units (c1): polymerized units based on a monomer having a hydroxy group without having a polyfluoroalkyl group, and Polymerized units (c2): polymerized units based on a monomer having a functional group which is reactive with the hydroxy group in the polymerized units (c1) to form a crosslinked structure.

Further, the present invention provides a method for producing a copolymer, which comprises polymerizing a monomer mixture comprising the following monomer (A), monomer (B), monomer (C1) and monomer (C2) in a medium in the presence of a polymerization initiator, preferably in a medium containing water in the presence of a surfactant and a polymerization initiator, to form a copolymer wherein, based on all monomers (100 mol %), the monomer (A) is from 40 to 85 mol %, the monomer (B) is from 10 to 55 mol %, and the total of the monomer (A) and the monomer (B) is at least 70 mol %:

Monomer (A): a monomer represented by the following formula (1):

$$Z—Y—X \quad (1)$$

(in the formula (1), Z is a $C_{4-6}$ polyfluoroalkyl group or a group represented by the following formula (2), Y is a bivalent organic group or a single bond, and X is any one of groups represented by the following formulae (3-1) to (3-5):

$$C_iF_{2i+1}O(CFX^1CF_2O)_jCFX^2— \quad (2)$$

(wherein i is an integer of from 1 to 6, j is an integer of from 0 to 10, and each of $X^1$ and $X^2$ is a fluorine atom or a trifluoromethyl group), $$—CR{=}CH_2 \quad (3\text{-}1)$$

$$—C(O)OCR{=}CH_2 \quad (3\text{-}2)$$

$$—OC(O)CR{=}CH_2 \quad (3\text{-}3)$$

$$—OCH_2\text{-}\phi\text{-}CR{=}CH_2 \quad (3\text{-}4)$$

$$—OCH{=}CH_2 \quad (3\text{-}5)$$

(wherein R is a hydrogen atom, a methyl group or a halogen atom, and φ is a phenylene group), Monomer (B): a linear or branched alkyl (meth)acrylate wherein the alkyl moiety has from 6 to 18 carbon atoms, (provided that when in the monomer (A), X in the formula (1) is a group represented by any one of the formulae (3-1) to (3-4) wherein R is a group being a methyl group or a halogen atom, the monomer (B) is an alkyl acrylate, and when in the monomer (A), X in the formula (1) is a group represented by any one of the formulae (3-1) to (3-4) wherein R is a group being a hydrogen atom, or a group represented by the formula (3-5), the monomer (B) is an alkyl methacrylate), Monomer (C1): a monomer having a hydroxy group without having a polyfluoroalkyl group, and Monomer (C2): a monomer having a functional group which is reactive with the hydroxy group in the monomer (C1) to form a crosslinked structure.

Further, the present invention provides an oil repellent composition comprising the above copolymer of the present invention and a medium, and an article treated with such an oil repellent composition.

ADVANTAGEOUS EFFECTS OF THE INVENTION

The copolymer of the present invention is capable of providing an article surface with sufficient oil repellency against oils having low surface tensions, with durability, and places little burden on the environment. Further, according to the method for producing a copolymer of the present invention, it is possible to produce a copolymer which is capable of providing an article surface with sufficient oil repellency against oils having low surface tensions, with durability and which places little burden on the environment.

Further, by using the oil repellent composition of the present invention containing the copolymer of the present invention, it is possible to provide an article surface with sufficient oil repellency against oils having low surface tensions, with durability, by virtue of the characteristics of the copolymer of the present invention. The article of the present invention treated with such an oil repellent composition of the present invention is excellent in oil repellency against oils having low surface tensions without containing a substance having a high environmental burden.

BEST MODE FOR CARRYING OUT THE INVENTION

Now, embodiments of the present invention will be described in detail. In this specification, a (meth)acrylate means an acrylate or a methacrylate. Likewise, a (meth)acrylamide means an acrylamide or a methacrylamide. And, a monomer in this specification means a compound having a polymerizable unsaturated group.

<Copolymer of the Present Invention>

The copolymer of the present invention comprises, as essential structural units, the following polymerized units (a) based on monomer (A), structural units (b) based on monomer (B), polymerized units (c1) based on monomer (C1) and polymerized units (c2) based on monomer (C2).

(Monomer (A))

Monomer (A) is a monomer represented by the formula (1) wherein a $C_{4-6}$ $R^f$ group or a group represented by the formula (2) (Z) and a group represented by any one of the formulae (3-1) to (3-5) (X) are bonded by a bivalent organic group or a single bond (Y).

$$Z—Y—X \quad (1)$$

$$C_iF_{2i+1}O(CFX^1CF_2O)_jCFX^2— \quad (2)$$

(wherein i is an integer of from 1 to 6, j is an integer of from 0 to 10, and each of $X^1$ and $X^2$ is a fluorine atom or a trifluoromethyl group).

$$—CR{=}CH_2 \quad (3\text{-}1)$$

$$—C(O)OCR{=}CH_2 \quad (3\text{-}2)$$

$$—OC(O)CR{=}CH_2 \quad (3\text{-}3)$$

$$—OCH_2\text{-}\phi\text{-}CR{=}CH_2 \quad (3\text{-}4)$$

$$—OCH{=}CH_2 \quad (3\text{-}5)$$

(wherein R is a hydrogen atom, a methyl group or a halogen atom, and φ is a phenylene group).

The above $R^f$ group is preferably one wherein the proportion of the number of fluorine atoms introduced by substitution is at least 60% based on the total number of hydrogen atoms in an alkyl group before substitution with fluorine atoms, more preferably an $R^f$ group wherein such a proportion is at least 80%. In the copolymer of the present invention, a further preferred $R^f$ group is an $R^F$ group wherein such a proportion is 100%. The $R^f$ group may be linear or branched, but in the copolymer of the present invention, a linear $R^f$ group is preferred.

As preferred Z in the copolymer of the present invention, the following $R^F$ groups may specifically be mentioned.

$F(CF_2)_4$—

$F(CF_2)_5$—

—$F(CF_2)_6$—

$(CF_3)_2CF(CF_2)_2$—

In the above formula (1) representing the monomer (A), Y is a bivalent organic group or a single bond, but Y is preferably a group containing an alkylene group. Such an alkylene group may be linear or branched. Further, Y may have —O—, —NH—, —CO—, —S—, —SO$_2$—, —CD$^1$=CD$^2$- (wherein each of D$^1$ and D$^2$ which are independent of each other, is a hydrogen atom or a methyl group), etc. Y is preferably an alkylene group.

As Y, the following groups may specifically be mentioned.

—CH$_2$—

—CH$_2$CH$_2$—

—(CH$_2$)$_3$—

—CH$_2$CH$_2$CH(CH$_3$)—

—CH=CH—CH$_2$—

—CH$_2$CH$_2$OCONHCH$_2$CH$_2$—

—SO$_2$N(CH$_3$)CH$_2$CH$_2$—

—S—CH$_2$CH$_2$—

—CH$_2$CH$_2$—S—CH$_2$CH$_2$—

—CH$_2$CH$_2$—SO$_2$—CH$_2$CH$_2$—, etc.

In the above formula (1) representing the monomer (A), X is a group represented by any one of the above formulae (3-1) to (3-5). However, in the present invention, X is preferably a (meth)acrylate group or an α-haloacrylate group represented by the formula (3-3), more preferably a (meth)acrylate group of the formula (3-3) wherein R is a hydrogen atom or a methyl group.

In the copolymer of the present invention, as the monomer (A), one of them may be used alone, or two or more of them may be used as a mixture.

The monomer (A) is preferably the following monomer (A1) or monomer (A2) from the viewpoint of the availability of such a monomer, the oil repellency of the copolymer, etc.

$C_6F_{13}C_2H_4OCOCH=CH_2$     Monomer (A1)

$C_6F_{13}C_2H_4OCOC(CH_3)=CH_2$     Monomer (A2)

(Monomer (B))

Monomer (B) is a linear or branched alkyl (meth)acrylate wherein the alkyl moiety has from 6 to 18 carbon atoms.

However, when in the monomer (A), X in the formula (1) is a group represented by any one of the formulae (3-1) to (3-4) wherein R is a group being a methyl group or a halogen atom (for descriptive purposes, a group of the monomer (A) satisfying this condition will hereinafter be referred to as "Group I"), the monomer (B) is an alkyl acrylate, and when in the monomer (A), X in the formula (1) is a group represented by any one of the formulae (3-1) to (3-4) wherein R is a group being a hydrogen atom, or a group represented by the formula (3-5) (for descriptive purposes, a group of the monomer (A) satisfying this condition will hereinafter be referred to as "Group II"), the monomer (B) is an alkyl methacrylate.

Only when the monomer (A) and the monomer (B) are in such a combination, high oil repellency can be obtained. The reason for such an effect is not clearly understood, but it is considered that the combination of an acrylate wherein the mobility of the main chain is relatively high and a methacrylate wherein a methyl group is bonded to the main chain and the mobility of the main chain is relatively low, is somehow related to such an effect. With an α-haloacrylate wherein halogen is bonded instead of the methyl group, an effect, similar to the methacrylate can be obtained.

As mentioned above, the monomer (A) may be a mixture of various monomers belonging to the monomer (A). In a case where the monomer (A) is a mixture of monomers selected from Group I and monomers selected from Group II, the monomer (B) is determined on the basis of the Group wherein the total molar ratio of monomers is larger than in the other Group. That is, in a case where the monomer (A) is a mixture of monomers selected from Group I and monomers selected from Group II, when the molar ratio of monomers selected from Group II is larger, the monomer (B) is an alkyl methacrylate, and when the molar ratio of monomers selected from Group I in the monomer (A) is larger, the monomer (B) is an alkyl acrylate.

In the copolymer of the present invention, as the monomer (B), one of them may be used alone, or two or more of them may be used as a mixture.

As the monomer (B), the following compounds may preferably be mentioned.

Hexyl (meth)acrylate, octyl (meth)acrylate, decyl (meth)acrylate, lauryl (meth)acrylate, myristyl (meth)acrylate, cetyl (meth)acrylate and stearyl (meth)acrylate.

2-Ethylhexyl (meth)acrylate, 6-methylheptyl (meth)acrylate, 2,4,6-trimethylheptyl (meth)acrylate, 16-methylheptadecyl (meth)acrylate, 2-pentylheptyl (meth)acrylate, 2-hexyloctyl (meth)acrylate, 2-heptylnonyl (meth)acrylate and 2-octyldecyl (meth)acrylate.

Further, in a case where the monomer (A) is a monomer selected from the above mentioned Group II such as an acrylate, the monomer (B) is preferably a linear or branched alkyl methacrylate wherein the alkyl moiety has from 6 to 10 carbon atoms, more preferably hexyl methacrylate, 2-ethylhexyl methacrylate, 2,4,6-trimethylheptyl methacrylate or the like.

In a case where the monomer (A) is a monomer selected from the above Group I such as a methacrylate or an α-haloacrylate wherein halogen is bonded instead of the methyl group, the monomer (B) may preferably be a linear or branched alkyl acrylate wherein the alkyl moiety has from 8 to 18 carbon atoms, more preferably a linear or branched alkyl acrylate wherein the alkyl moiety has from 10 to 18 carbon atoms, further preferably decyl acrylate, lauryl acrylate, myristyl acrylate, cetyl acrylate, stearyl acrylate, 16-methylheptadecyl acrylate, 2-pentylheptyl acrylate, 2-hexyloctyl acrylate, 2-heptylnonyl acrylate, 2-octyldecyl acrylate or the like.

(Monomer (C1))

Monomer (C1) is a monomer having a hydroxy group without having an $R^f$ group. The hydroxy group of the monomer (C1) is reactive with a functional group of the after-mentioned monomer (C2) capable of forming a crosslinked structure by a reaction with a hydroxy group, thereby to make it possible to introduce a crosslinked structure to the copolymer. The copolymer of the present invention having a crosslinked structure introduced in such a manner, has sufficient oil repellency particularly against oils having low surface tensions and at the same dime is excellent in the durability.

The number of hydroxy groups which the monomer (C1) has, may be one or more, preferably at most 2.

Further, the monomer (C1) may, for example, be preferably a (meth)acrylate, a (meth)acrylamide, a vinyl ether or a styrene. In the copolymer of the present invention, as the monomer (C1), one of them may be used alone, or two or more of them may be used as a mixture.

As the monomer (C1), the following compounds may specifically be mentioned.

The (meth)acrylate may, for example, be 2-hydroxyethyl (meth)acrylate, 2-hydroxypropyl (meth)acrylate, 4-hydroxybutyl (meth)acrylate, 3-chloro-2-hydroxypropyl methacrylate, 1,4-cyclohexanedimethanol monoacrylate, polyoxyalkylene glycol mono(meth)acrylate or a polycaprolactone ester of hydroxyethyl (meth)acrylate (e.g. "PLACCEL FA", "PLACCEL FM" series, tradenames, manufactured by DAICEL CHEMICAL INDUSTRIES, LTD.).

The (meth)acrylamide may, for example, be N-methylol (meth)acrylamide, N-hydroxyethyl (meth)acrylamide or N-hydroxybutyl acrylamide.

The vinyl ether may, for example, be 2-hydroxyethyl vinyl ether, 4-hydroxybutyl vinyl ether, diethylene glycol monovinyl ether or cyclohexanedimethanol monovinyl ether.

The styrene may, for example, be 4-hydroxystyrene, 4-hydroxy-α-methylstyrene or 3-methoxy-4-hydroxystyrene. In the present invention, as a more preferred monomer (C1) among them, a (meth)acrylate may be mentioned from the viewpoint of the copolymerizability.

Further, among the above exemplified (meth)acrylates, 2-hydroxyethyl (meth)acrylate, 2-hydroxypropyl (meth)acrylate, 4-hydroxybutyl (meth)acrylate or 3-chloro-2-hydroxypropyl (meth)acrylate is more preferred as the monomer (C1) to be used in the present invention.

(Monomer (C2))

Monomer (C2) is a monomer having a functional group which is reactive with the hydroxy group in the monomer (C1) to form a crosslinked structure.

The number of functional groups which the monomer (C2) has, may be one or more, but preferably at most 2.

In the monomer (C2), the functional group which is reactive with the hydroxy group in the monomer (C1) to form a crosslinked structure, may, for example, be preferably an isocyanate group which may be blocked, a carboxyl group, —CO—O—CO— (acid anhydride), —CO—W (an acid halide: W is a halogen group (chloro, bromo or iodo)) or a halogen group. In the copolymer of the present invention, as the monomer (C2), one of them may be used alone, or two or more of them may be used as a mixture.

The functional group which the monomer (C2) has, is reactive with the hydroxy group in the monomer (C1) to form an urethane bond in the case of an isocyanate group which may be blocked, an ester bond in the case of a carboxyl group, —CO—O—CO— (acid anhydride) or —CO—W (acid halide: W is a halogen group), or an ether bond in the case of a halogen group, and such a bond constitutes the crosslinked structure in the copolymer of the present invention.

As the monomer (C2), the following compounds may specifically be mentioned.

The monomer having an isocyanate group or a blocked isocyanate group, may, for example, be 2-isocyanatoethyl (meth)acrylate, 3-isocyanatopropyl (meth)acrylate, 4-isocyanatobutyl (meth)acrylate, a 2-butanone oxime adduct of 2-isocyanatoethyl (meth)acrylate, a pyrazole adduct of 2-isocyanatoethyl (meth)acrylate, a 3,5-dimethylpyrazole adduct of 2-isocyanatoethyl (meth)acrylate, a 3-methylpyrazole adduct of 2-isocyanatoethyl (meth)acrylate, an ε-caprolactam adduct of 2-isocyanatoethyl (meth)acrylate, a 2-butanone oxime adduct of 3-isocyanatopropyl (meth)acrylate, a pyrazole adduct of 3-isocyanatopropyl (meth)acrylate, or 3-(methylethylketoxime)isocyanatomethyl-3,5,5-trimethylcyclohexyl-(2-hydroxyethylmethacrylate) isocyanate.

The monomer having a carboxyl group may, for example, be a (meth)acrylic acid, 2-chloroacrylic acid, 2-bromoacrylic acid, 2-(trifluoromethyl)acrylic acid, 6-acrylamide hexanoic acid, or mono(2-acryloyloxyethyl)succinate.

The monomer having —CO—O—CO— (acid anhydride) may, for example, be maleic anhydride, citraconic anhydride, itaconic anhydride, 5-norbornene-2,3-dicarboxylic acid anhydride, exo-3,6-epoxy-1,2,3,6-tetrahydrophthalic anhydride, cis-4-cyclohexene-1,2-dicarboxylic acid anhydride or 4-vinylbenzoic acid.

The monomer having —CO—W (acid halide: W is a halogen group) may, for example, be a (meth)acrylic acid chloride.

The monomer having a halogen group may, for example, be ethyl 2-(chloromethyl)acrylate, ethyl 2-(bromomethyl)acrylate, 2-chloroethyl vinyl ether, vinyl ether, vinyl chloroacetate, vinyl bromoacetate or 4-chloromethylstyrene. In the monomer (C2), the functional group which is reactive with the hydroxy group in the monomer (C1) to form a crosslinked structure, is preferably an isocyanate group which may be blocked, from the viewpoint of the reactivity and the stability of the bond after the reaction and is preferably a blocked isocyanate group from the viewpoint of the stability during the production or storage. Further, as the polymerizable unsaturated group in the monomer (C2), a (meth)acrylate group is preferred from the viewpoint of the copolymerizability.

From such viewpoints, among the above exemplified monomers (C2), a 2-butanone oxime adduct of 2-isocyanatoethyl (meth)acrylate or a 3,5-dimethylpyrazole adduct of 2-isocyanatoethyl (meth)acrylate is particularly preferred.

(Proportions)

Preferred proportions of the polymerized units (a) and the polymerized units (b) contained as essential structural units in the copolymer of the present invention are such that based on all polymerized units (100 mmol %), the proportion of the polymerized units (a) is preferably from 40 to 85 mol %, and the proportion of the polymerized units (b) is preferably from 10 to 55 mol %. Further, the total of the proportions of the polymerized units (a) and the polymerized units (b) is preferably at least 70 mol %, more preferably at least 80 mol %, particularly preferably at least 90 mol %, based on all polymerized units (100 mol %). The copolymer of the present invention wherein the proportions of the polymerized units (a) and the polymerized units (b) are within such ranges, has excellent oil repellency against oils having low surface tensions.

In the copolymer of the present invention, when the polymerized units (a) are polymerized units based on a monomer of the above formula (1) wherein X is a group represented by any one of the formulae (3-1) to (3-4) wherein R is a group being a hydrogen atom, or a group represented by the formula (3-5), and the polymerized units (b) are polymerized units based on a methacrylate, a preferred proportion of the polymerized units (a) is from 45 to 85 mol %, more preferably from 45 to 70 mol %, based on all polymerized units (100 mol %). Further, in such a case, a preferred proportion of the polymerized units (b) is from 10 to 50 mol %, more preferably from 25 to 50 mol %, based on all polymerized units (100 mol %). In such ranges, the copolymer of the present invention has excellent oil repellency not only against a polar liquid or a hydrocarbon type liquid having a relatively high surface tension but also against a hydrocarbon type liquid having a low surface tension.

In the copolymer of the present invention, when the polymerized units (a) are polymerized units based on a monomer of the above formula (1) wherein X is a group represented by any one of the formulae (3-1) to (3-4) wherein R is a group being a methyl group or a halogen atom, and the polymerized units (b) are polymerized units based on an acrylate, a preferred proportion of the polymerized units (a) is from 40 to 70 mol %, more preferably from 45 to 60 mol %, based on all polymerized units (100 mol %). Further, in such a case, a preferred proportion of the polymerized units (b) is from 25 to 55 mol %, more preferably from 35 to 50 mol %, based on all polymerized units (100 mol %). In such ranges, the copolymer of the present invention has excellent oil repellency not only against a polar liquid or a hydrocarbon type liquid having a relatively high surface tension but also against a hydrocarbon type liquid having a low surface tension.

With respect to the proportions of the polymerized units (c1) and the polymerized units (c2) contained as essential structural units in addition to the above mentioned polymerized units (a) and (b) in the copolymer of the present invention, from the viewpoint of the oil repellency against a low surface tension liquid and its durability, the proportion of the polymerized units (c1) is preferably from 0.1 to 10 mol %, more preferably from 0.5 to 8 mol %, particularly preferably from 1 to 6 mol %, based on all polymerized units (100 mol %). Likewise, the proportion of the polymerized units (c2) is preferably from 0.1 to 5 mol %, more preferably from 0.5 to 4 mol %, particularly preferably from 1 to 4 mol %.

Here, in the copolymer of the present invention, the proportion of polymerized units based on each monomer, based on all polymerized units (100 mol %), is one calculated on the basis of the amount of the monomer charged at the time of the production of the copolymer.

In the copolymer of the present invention, in addition to the above described polymerized units (a), polymerized units (b), polymerized units (c1) and polymerized units (c2) as essential structural units, polymerized units (d) based on one or more types of the monomer (D) which will be described below, may be contained as polymerized units, as the case requires.

(Monomer (D))

Monomer (D) is not particularly limited so long as it is copolymerizable with the monomer (A), monomer (B), monomer (C1) and monomer (C2) which will form the essential structural units of the copolymer of the present invention. Further, it is not particularly limited so long as it is a monomer which is preferably capable of imparting other characteristics without substantially impairing the effects of the copolymer of the present invention (i.e. low environmental burden and excellent oil repellency against a low surface tension liquid), when the polymerized units (d) based on the monomer (D) are introduced by properly adjusting its proportion into the copolymer of the present invention. As the monomer (D), two or more types of the monomer (D) may be used.

In other words, the polymerized units (d) as optional structural units, may be contained in the copolymer in a proportion within a range not to impair the properties of the copolymer, although such may depend also on their constitution. As the proportion of such polymerized units (d), a proportion of up to 30 mol % at the maximum based on all polymerized units (100 mmol %) may specifically be mentioned. In consideration of the development of the effects of the present invention, the proportion of the polymerized units (d) is preferably at most 10 mol %, more preferably at most 5 mol %, based on all polymerized units (100 mol %). However, the proportion may suitably be adjusted depending upon the type of the polymerized units (d). For example, in a case where the polymerized units (d) has a characteristic to lower the oil repellency of the copolymer against oils having low surface tensions, their amount is required to be small even if they are permitted to be present in the copolymer. Specific examples of the monomer (D) and the proportion are as follows.

The monomer (D) may, for example, be a linear or branched alkyl (meth)acrylate not belonging to the monomer (B), a (meth)acrylate having a cyclic alkyl group or aromatic ring in its side chain, a (meth)acrylate having silicone in its side chain, a (meth)acrylate having an urethane bond, a (meth)acrylate having a polyoxyalkylene chain having a terminal $C_{1-18}$ alkyl group, a vinyl carboxylic acid or a styrene. In a case where such a monomer (D) is employed, the proportion of polymerized units (d) in the copolymer may be up to 30 mol % at the maximum, preferably at most 20 mol %, more preferably at most 10 mol %, based on all polymerized units (100 mol %).

The monomer (D) may contain a functional group such as an amino group, an epoxy group or an alkoxysilyl group. When polymerized units (d) having such functional groups are present in the copolymer, the adhesion of the copolymer to a substrate will be improved. As such a monomer (D), a (meth)acrylamide such as (meth)acrylamide, diacetone (meth)acrylamide, an epoxy group-containing (meth)acrylate such as glycidyl (meth)acrylate, or an alkoxysilyl group-containing (meth)acrylate such as (meth)acryloyloxypropyl-triethoxysilane, may, for example, be mentioned. In a case where such a monomer (D) is employed, the proportion of the polymerized units (d) in the copolymer may be up to 10 mol % at the maximum, preferably at most 5 mol %, more preferably at most 3 mol %, based on all polymerized units (100 mol %).

The monomer (D) may be a vinyl halide. When such a monomer is present in the copolymer, the adhesive property of the copolymer to a substrate will be improved, whereby the coating film strength can be improved. As such a monomer, vinyl chloride or vinylidene chloride may, for example, be mentioned. In a case where such a monomer (D) is employed, the proportion of the polymerized units (d) in the copolymer may be up to 30 mol % at the maximum, preferably at most 20 mol %, more preferably at most 10 mol %, based on all polymerized units (100 mol %).

In the copolymer of the present invention, its mass average molecular weight (Mw) is preferably from 100,000 to 500,000, more preferably from 100,000 to 350,000. If the mass average molecular weight is less than 100,000, the oil repellency against oils having low surface tensions may sometimes be low, and if it exceeds 500,000, the solubility in a solvent may sometimes be low.

Here, the mass average molecular weight (Mw) of the copolymer in this specification is a molecular weight measured by gel permeation chromatography (GPC) and calculated as polystyrene.

<Method for Producing Copolymer of the Present Invention>

The copolymer of the present invention can be produced by polymerizing the above described various monomers.

As the polymerization method, a polymerization method such as an ion polymerization method or a radical polymerization method may be employed. A radical polymerization method is particularly preferred, since the polymerization can be carried out under a mild condition by using a radical initiator as the polymerization initiator. The radical polymerization may specifically be carried out by using a polymerization method such as suspension polymerization, solution polymerization, bulk polymerization or emulsion polymerization.

Among such polymerization methods, in the production of the copolymer of the present invention, it is preferred to adopt a method of the present invention wherein polymerization is carried out in a medium in the presence of a polymerization initiator, and solution polymerization employing a solvent as the above medium or emulsion polymerization employing a medium containing a surfactant and water, is more preferably employed.

Specifically, the method of the present invention is one which comprises polymerizing a monomer mixture comprising from 40 to 85 mmol % of the monomer (A), from 10 to 55 mol % of the monomer (B) (the total of the monomers (A) and (B) being at least 70 mol %) based on all monomers (100 mmol %), the monomer (C1) and the monomer (C2) as monomers essential for the production of the copolymer of the present invention, and the monomer (D) optionally added as the case requires, in a medium in the presence of a polymerization initiator, preferably in a medium containing water in the presence of a surfactant and a polymerization initiator.

Here, in the method of the present invention, preferred proportions of the respective monomers based on the monomer mixture (all monomers to be used for the production) are the same as the preferred proportions of the respective polymerized units based on all polymerized units in the copolymer of the present invention.

Further, in the method for producing a copolymer of the present invention, the concentration of the monomer mixture in a medium is such that the volume proportion of the monomer mixture based on the medium is preferably from 5 to 50 vol %, more preferably from 20 to 40 vol %.

Further, in the method for producing a copolymer of the present invention to carry out the polymerization in a medium containing water in the presence of a surfactant and a polymerization initiator, the proportion (mass %) of water in the medium is preferably from 50 to 100 mass %, more preferably from 70 to 90 mass %.

As the radical polymerization initiator, a common initiator such as an azo type polymerization initiator, a peroxide type polymerization initiator or a redox type initiator is used depending upon the polymerization temperature. As the radical polymerization initiator, an azo type compound is particularly preferred, and in a case where the polymerization is carried out in an aqueous medium, a salt of the azo type compound is more preferred.

The amount of the polymerization initiator to be added, is preferably from 0.05 to 5 parts by mass, more preferably from 0.1 to 3 parts by mass, per 100 parts by mass of the monomer mixture.

At the time of the polymerization of the monomer mixture, a molecular weight-controlling agent may be employed. As the molecular weight-controlling agent, an aromatic compound, a mercapto alcohol or a mercaptan is preferred, and an alkyl mercaptan is particularly preferred. As such a molecular weight-controlling agent, mercapto ethanol, n-octyl mercaptan, n-dodecyl mercaptan, t-dodecyl mercaptan or stearyl mercaptan may, for example, be specifically mentioned.

The amount of the molecular weight-controlling agent to be added is preferably from 0.01 to 5 parts by mass, more preferably from 0.1 to 3 parts by mass, per 100 parts by mass of the monomer mixture.

The polymerization temperature is preferably from 20 to 150° C. As other polymerization conditions, it is possible to use the same conditions as used for usual polymerization for (meth)acrylate type copolymers. For example, the polymerization may be carried out in a nitrogen atmosphere, or an operation such as shaking may be applied, such being preferred conditions also in the method of the present invention. The polymerization time depends on the polymerization temperature, etc. and other polymerization conditions, but by carrying out the polymerization for from 2 to 24 hours, it is possible to obtain the copolymer of the present invention.

Further, in order to obtain the copolymer of the present invention within the above mentioned preferred molecular weight, i.e within the range of a mass average molecular weight (Mw) of from 100,000 to 500,000, conditions such as the monomer concentration, the amount of the polymerization initiator, the polymerization temperature, the amount of the molecular weight-controlling agent, etc., may be adjusted within the above described preferred ranges. Usually, the molecular weight tends to be large (small) under such conditions that the monomer concentration is high (low), the amount of the polymerization initiator is small (large), the polymerization temperature is low (high) and the amount of the molecular weight-controlling agent is small (large).

According to the method of the present invention, the copolymer of the present invention is obtained in a state of a solution, dispersion or emulsion containing it.

The copolymer of the present invention may be used in such a state, as e.g. a raw material for an oil repellent composition. However, it may be separated from the solution, dispersion, emulsion or the like and purified before use. As the method for separation and purification, it is possible to employ a usual method such as solvent distillation, reprecipitation or the like.

Now, solution polymerization and emulsion polymerization to be preferably used for the method of the present invention will be described.

(Solution Polymerization)

In order to produce the copolymer of the present invention by solution polymerization, the above described proportions of various monomers, the polymerization initiator and, as the case requires, an optional component such as a molecular weight-controlling agent, may be dissolved in a polymerization solvent and polymerized under usual polymerization conditions (e.g. in a nitrogen atmosphere at from 20 to 150° C. for from 2 to 24 hours).

The polymerization solvent to be used in the present invention may be one which is capable of dissolving all monomers to be used for the polymerization reaction and capable of dissolving or dispersing the formed copolymer. From the viewpoint of the productivity and the stability of the obtainable solution or dispersion, the amount of the polymerization solvent to be used may be such that the concentration of the monomer mixture becomes preferably from 5 to 50 vol %, more preferably from 20 to 40 vol %, by the volume ratio of the monomer mixture to the polymerization solvent. Further, the polymerization solvent to be used in the present invention will be exemplified below, but in the method of the present invention, one of these solvents may be used alone, or two or more of them may be used as a solvent mixture.

The copolymer of the present invention obtainable by the solution polymerization may be used as a raw material for a product in the form as dissolved or dispersed in the solvent, or it may be used after separation and purification by a usual method.

(Polymerization Solvent)

The polymerization solvent to be used for the polymerization reaction may, for example, be a halogen compound, a hydrocarbon, a ketone, an ester or an ether.

The halogen compound may, for example, be a halogenated hydrocarbon or a halogenated ether.

The halogenated hydrocarbon may, for example, be a hydrochlorofluorocarbon or a hydrofluorocarbon.

The hydrochlorofluorocarbon may, for example, be $CH_3CCl_2F$, $CHCl_2CF_2CF_3$ or $CHClFCF_2CClF_2$.

The hydrofluorocarbon may, for example, be $CF_3CHFCHFCF_2CF_3$, $CF_3(CF_2)_4CHF_2$, $CF_3CF_2CF_2CH_2CH_2CH_3$, $CF_3(CF_2)_5CH_2CH_3$ or 1,1,2,2,3,3,4-heptafluorocyclopentane.

The halogenated ether may, for example, be a hydrofluoro ether.

The hydrofluoro ether may, for example, be a separation-type hydrofluoro ether or a non-separation type hydrofluoro ether. The separation-type hydrofluoro ether is a compound wherein an $R^F$ group or a perfluoroalkylene group, and an alkyl group or an alkylene group, are bonded via an etheric oxygen atom. The non-separation type hydrofluoro ether is a hydrofluoro ether containing a partially fluorinated alkyl or alkylene group.

The separation type hydrofluoro ether may, for example, be $CF_3CF_2CF_2CF_2OCH_3$, $(CF_3)_2CFCF_2OCH_3$, $CF_3CF_2CF_2CF_2OCH_2CH_3$, $(CF_3)_2CFCF_2OCH_2CH_3$, $CF_3CF_2CF(OCH_3)CF(CF_3)_2$, $CF_3CF_2CF(OCH_2CH_3)CF(CF_3)_2$ or $C_3H_7OCF(CF_3)CF_2OCH_3$.

The non-separation type hydrofluoro ether may, for example, be $CHF_2CF_2OCH_2CF_3$, or $CF_3CF_2CH_2OCF_2CHF_2$.

The hydrocarbon may, for example, be an aliphatic hydrocarbon, an alicyclic hydrocarbon or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane.

The alicyclic hydrocarbon may, for example, be cyclopentane, methylcyclopentane, cyclohexane, methylcyclohexane or ethylcyclohexane.

The aromatic hydrocarbon may, for example, be benzene, toluene or xylene.

The ketone may, for example, be acetone, methyl ethyl ketone, 2-pentanone, 3-pentanone, 2-hexanone or methyl isobutyl ketone.

The ester may, for example, be methyl acetate, ethyl acetate, butyl acetate, methyl propionate, methyl lactate, ethyl lactate or pentyl lactate.

The ether may, for example, be diisopropyl ether, dioxane or tetrahydrofuran.

(Emulsion Polymerization)

In order to produce the copolymer of the present invention by emulsion polymerization, the above described proportions of various monomers, the polymerization initiator, the surfactant and, as the case requires, an optional component such as a molecular weight-controlling agent, may be mixed and emulsified with an aqueous medium, preferably a medium containing water, and polymerized under usual polymerization conditions (e.g. in a nitrogen atmosphere, at from 20 to 150° C. under a shaking condition for from 2 to 24 hours).

Here, with a view to improving the yield of the copolymer, it is preferred to preliminarily emulsify a mixture comprising various monomers as raw material components for the copolymer of the present invention, the surfactant and the aqueous medium, before the emulsion polymerization. Specifically, as a method for the preliminary emulsification, the mixture comprising various monomers, the surfactant and the aqueous medium is mixed and dispersed by a homomixer or a high pressure emulsifier, if necessary, by heating. Here, the particle size of the obtainable copolymer may be adjusted as the case requires, by the type and amount of the surfactant as well as such preliminary emulsification conditions, e.g. the rotational speed of the homomixer, the pressure during the high pressure emulsification, etc. Usually, the particle size of the copolymer tends to be small (large) when the dispersion is prepared under such conditions that the amount of the surfactant is large (small), the rotational speed of the homomixer is high (low) and the pressure during the high pressure emulsification is high (low).

The aqueous medium to be used in the present invention may be one capable of forming an emulsified state with this aqueous medium, the monomers as the raw material components for the copolymer of the present invention and the surfactant. From the viewpoint of the productivity and the stability of the obtainable dispersion, the amount of the aqueous medium to be used may be such an amount that the concentration of the monomer mixture becomes preferably from 5 to 50 vol %, more preferably from 20 to 40 vol %, by the volume ratio of the monomer mixture to the aqueous medium.

The aqueous medium to be used in the present invention will be exemplified below, but in the method of the present invention, one of such aqueous media may be used alone, or two or more of them may be used as mixed. In a case where two or more media are used as mixed, it is preferred to use them as mixed with water. By using mixed media, it becomes easy to control the solubility and dispersibility of the copolymer and to control the penetrating property to an article during the processing, wettability, solvent-drying rate, etc.

Further, the surfactant to be used in the present invention will be exemplified below, but in the method of the present invention, one of such surfactants may be used alone, or two or more of them may be used as mixed.

The total amount of surfactants to be used is preferably from 1 to 15 parts by mass, more preferably from 2 to 12 parts by mass, per 100 parts by mass of the monomer mixture.

The copolymer of the present invention obtainable by the emulsion polymerization may be used as a raw material for a product in such a form as dispersed in the medium, or it may be used alter separation and purification by a usual method.

(Aqueous Medium)

The aqueous medium may, for example, be water, an alcohol, a glycol ether, a halogen compound, a hydrocarbon, a ketone, an ester or an ether. Among them, from the viewpoint of the solubility, and handling efficiency, at least one medium selected from the group consisting of water, an alcohol, a glycol, a glycol ether and a glycol ester is preferred.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol or 3-heptanol.

The glycol or glycol ether may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, as a glycol ether, propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol or hexylene glycol.

As the halogen compound, hydrocarbon, ketone, ester or ether, the same compounds as the solvents for the above mentioned solution polymerization may be mentioned.

(Surfactant)

The surfactant may, for example, be a hydrocarbon type surfactant or a fluorine-type surfactant, and each may be an anionic surfactant, a nonionic surfactant, a cationic surfactant or an amphoteric surfactant.

As the surfactant, from the viewpoint of the dispersion stability, it is preferred to use a nonionic surfactant and a cationic surfactant or an amphoteric surfactant in combination, or to use an anionic surfactant alone. It is more preferred to use a nonionic surfactant and a cationic surfactant in combination.

The ratio of the nonionic surfactant to the cationic surfactant (the nonionic surfactant/the cationic surfactant) is preferably from 97/3 to 40/60 (mass ratio).

As the nonionic surfactant, at least one selected from the group consisting of surfactants $S^1$ to $S^6$ is preferred.

[Surfactant $S^1$]

The surfactant $S^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

As the surfactant $S^1$, a polyoxyalkylene monoalkyl ether, a polyoxyalkylene monoalkenyl ether or a polyoxyalkylene monopolyfluoroalkyl ether is preferred. As the surfactant $S^1$, one type may be used alone, or two or more types may be used in combination.

As the alkyl group, the alkenyl group, the alkapolyenyl group or the polyfluoroalkyl group (hereinafter, the alkyl group, the alkenyl group, the alkapolyenyl group and the polyfluoroalkyl group may generally be referred to as an $R^s$ group), a group having from 4 to 26 carbon atoms is preferred. $R^s$ group may be linear or branched. As a branched $R^s$ group, a secondary alkyl group, a secondary alkenyl group or a secondary alkapolyenyl group is preferred. In the $R^s$ group, some or all of hydrogen atoms may be substituted by fluorine atoms.

Specifically, the $R^s$ group may, for example, be an octyl group, a dodecyl group, a tetradecyl group, a hexadecyl group, a stearyl group (an octadecyl group), a behenyl group (a docosyl group), an oleyl group (a 9-octadecenyl group), a heptadecylfluorooctyl group, a tridecylfluorohexyl group, 1H,1H,2H,2H-tridecylfluorooctyl group or a 1H,1H,2H,2H-nonafluorohexyl group.

The polyoxyalkylene (hereinafter referred to as POA) chain is preferably a chain having at least two polyoxyethylene (hereinafter referred to as POE) chains and/or polyoxypropylene (hereinafter referred to as POP) chains linked to one another. The POA chain may be a chain made of one type of POA chain or a chain made of at least two POA chains. In a case where it is made of at least two POA chains, the respective POA chains are preferably linked in a block state.

The surfactant $S^1$ is more preferably a compound ($S^{11}$).

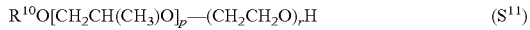

wherein $R^{10}$ is an alkyl group having at least 8 carbon atoms or an alkenyl group having at least 8 carbon atoms, r is an integer of from 5 to 50, and p is an integer of from 0 to 20. In $R^{10}$, some of hydrogen atoms may be substituted by fluorine atoms.

When r is at least 5, the compound becomes soluble in water and will be uniformly dissolved in an aqueous medium, whereby the penetration property of the oil repellent composition to an article will be good. When r is at most 50, the hydrophilicity will be suppressed, and the water repellency will be good.

When p is at most 20, the compound will be soluble in water and will be uniformly dissolved in an aqueous medium, whereby the penetration property of the oil repellent composition to an article will be good.

When r and p are at least 2, the POE chains, and the POP chains will be linked in a block state.

$R^{10}$ is preferably linear or branched.

r is preferably an integer of from 10 to 30.

p is preferably an integer of from 0 to 10.

As the compound ($S^{11}$), the following compounds may be mentioned, wherein POE chains and POP chains are linked in a block state.

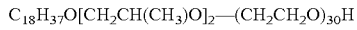

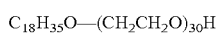

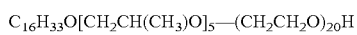

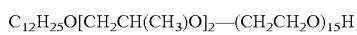

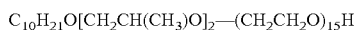

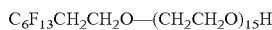

[Surfactant $S^2$]

The surfactant $S^2$ is a nonionic surfactant made of a compound having at least one carbon-carbon triple bond and at least one hydroxy group in its molecule.

As the surfactant $S^2$, a nonionic surfactant made of a compound having one carbon-carbon triple bond and one or two hydroxy groups in its molecule, is preferred.

The surfactant $S^2$ may have a POA chain in its molecule. The POA chain may, for example, be a POE chain, a POP chain, a chain wherein POE chains and POP chains are randomly linked, or a chain wherein POE chains and POP chains are linked in a block state.

As the surfactant $S^2$, compounds ($S^{21}$) to ($S^{24}$) are preferred.

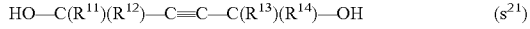

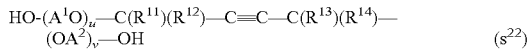

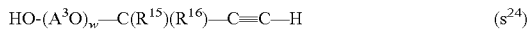

Each of $A^1$ to $A^3$ is an alkylene group.

Each of u and v is an integer of at least 0, provided that (u+v) is an integer of at least 1.

w is an integer of at least 1.

In a case where u, v, and w are respectively at least 2, plural $A^1$ to $A^3$ may, respectively, the same or different.

The POA chain is preferably a POE chain, a POP chain or a chain containing a POE chain and a POP chain. The number of repeating units in a POA chain is preferably from 1 to 50.

Each of $R^{11}$ to $R^{16}$ is a hydrogen atom or an alkyl group.

The alkyl group is preferably a $C_{1-12}$ alkyl group, more preferably a $C_{1-4}$ alkyl group. The alkyl group may, for example, be a methyl group, an ethyl group, a propyl group, a butyl group or an isobutyl group.

As the compound ($S^{22}$), a compound ($S^{25}$) is preferred.

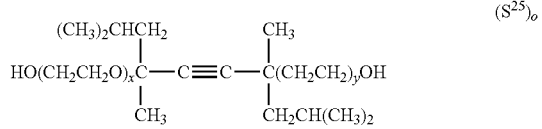

wherein each of x and y is an integer of from 0 to 100.

As the compound ($S^{25}$), one type may be used alone, or two or more types may be used in combination.

As the compound ($S^{25}$), a compound wherein x and y are 0, a compound wherein the sum of x and y is from 1 to 4 on average, or a compound wherein the sum of x and y is from 10 to 30 on average, is preferred.

[Surfactant $S^3$]

The surfactant $S^3$ is a nonionic surfactant made of a compound wherein a POE chain and a POA chain having at least two oxyalkylenes each having at least 3 carbon atoms linked, are linked, and both terminals are hydroxy groups.

The POA chain is preferably a polyoxytetramethylene (hereinafter referred to as POT) and/or a POP chain.

As the surfactant $S^3$, a compound ($S^{31}$) or a compound ($S^{32}$) is preferred.

$$HO(CH_2CH_2O)_{g1}(C_3H_6O)_t(CH_2CH_2O)_{g2}H \qquad (S^{31})$$

$$HO(CH_2CH_2O)_{g1}(CH_2CH_2CH_2CH_2O)_t(CH_2CH_2O)_{g2}H \qquad (S^{32})$$

g1 is an integer of from 0 to 200.
t is an integer of from 2 to 100.
g2 is an integer of from 0 to 200.

When g1 is 0, g2 is an integer of at least 2. When g2 is 0, g1 is an integer of at least 2.

—$C_3H_6O$— may be —$CH(CH_3)CH_2O$—, —$CH_2CH(CH_3)O$—, or a mixture of —$CH(CH_3)CH_2O$— and —$CH_2CH(CH_3)O$—.

The POA chain is in a block state.

As the surfactant $S^3$, the following compounds may be mentioned.

HO—$(CH_2CH_2O)_{15}$—$(C_3H_6O)_{35}$—$(CH_2CH_2O)_{15}$H

HO—$(CH_2CH_2O)_{8}$—$(C_3H_6O)_{35}$—$(CH_2CH_2O)_{8}$H

HO—$(CH_2CH_2O)_{45}$—$(C_3H_6O)_{17}$—$(CH_2CH_2O)_{45}$H

HO—$(CH_2CH_2O)_{34}$—$(CH_2CH_2CH_2CH_2O)_{28}$—$(CH_2CH_2O)_{34}$H

[Surfactant $S^4$]

The surfactant $S^4$ is a nonionic surfactant having an amine oxide moiety in its molecule.

As the surfactant $S^4$, a compound ($S^{41}$) is preferred.

$$(R^{17})(R^{18})(R^{19})N(\rightarrow O) \qquad (S^{41})$$

Each of $R^{17}$ to $R^{19}$ is a monovalent hydrocarbon group.

In the present invention, a surfactant having an amine oxide ($N\rightarrow O$) is regarded as a nonionic surfactant.

As the compound ($S^{41}$), one type may be used alone, or two or more types may be used in combination.

As the compound ($S^{41}$), from the viewpoint of the dispersion stability of the copolymer, a compound ($S^{42}$) is preferred.)

$$(R^{20}(CH_3)_2N(\rightarrow O)) \qquad (S^{42})$$

$R^{20}$ is a $C_{6-22}$ alkyl group, a $C_{6-22}$ alkenyl group, a phenyl group to which a $C_{6-22}$ alkyl group is bonded, a phenyl group to which a $C_{6-22}$ alkenyl group is bonded, or a $C_{6-13}$ fluoroalkyl group. Further, $R^{20}$ is preferably a $C_{8-22}$ alkyl group or a $C_{8-22}$ alkenyl group, or a $C_{4-6}$ polyfluoroalkyl group.

As the compound ($S^{42}$), the following compounds may be mentioned.

$[H(CH_2)_{12}](CH_3)_2N(\rightarrow O)$ $[H(CH_2)_{14}](CH_3)_2N(\rightarrow O)$ $[H(CH_2)_{16}](CH_3)_2N(\rightarrow O)$ $[H(CH_2)_{18}](CH_3)_2N(\rightarrow O)$ $[F(CF_2)_6(CH_2)_2](CH_3)_2N(\rightarrow O)$ $[F(CF_2)_4(CH_2)_2](CH_3)_2N(\rightarrow O)$

[Surfactant $S^5$]

The surfactant $S^5$ is a nonionic surfactant made of a condensate of a polyoxyethylene mono(substituted phenyl)ether, or a polyoxyethylene mono(substituted phenyl)ether.

The substituted phenyl group is preferably a phenyl group substituted by a monovalent hydrocarbon group, more preferably a phenyl group substituted by an alkyl group, an alkenyl group or a styryl group.

The surfactant $S^5$ is preferably a condensate of a polyoxyethylene mono(alkylphenyl)ether, a condensate of a polyoxyethylene mono(alkenylphenyl)ether, a polyoxyethylene mono(alkylphenyl)ether, a polyoxyethylene mono(alkenylphenyl)ether, or a polyoxyethylene mono[(alkyl)(styryl)phenyl]ether.

The condensate of a polyoxyethylene mono(substituted phenyl)ether or the polyoxyethylene mono(substituted phenyl)ether may, for example, be a formaldehyde condensate of a polyoxyethylene mono(nonylphenyl)ether, a polyoxyethylene mono(nonylphenyl)ether, a polyoxyethylene mono(octylphenyl)ether, a polyoxyethylene mono(oleylpheyl)ether, a polyoxyethylene mono[(nonyl)(styryl)phenyl]ether or a polyoxyethylene mono[(oleyl)(styryl)phenyl]ether.

[Surfactant $S^6$]

The surfactant $S^6$ is a nonionic surfactant made of a fatty acid ester of a polyol.

The polyol represents glycerin, sorbitan, sorbit, polyglycerin, polyethylene glycol, polyoxyethylene glyceryl ether, polyoxyethylene sorbitan ether or polyoxyethylene sorbit ether.

The surfactant $S^6$ may, for example, be a 1:1 (molar ratio) ester of stearic acid and polyethylene glycol, a 1:4 (molar ratio) ester of an ether of sorbit and a polyethylene glycol, and oleic acid, a 1:1 (molar ratio) ester of an ether of a polyoxyethylene glycol and sorbitan, and stearic acid, a 1:1 (molar ratio) ester of an ether of polyethylene glycol and sorbitan, and oleic acid, a 1:1 (molar ratio) ester of dodecanoic acid and sorbitan, a 1:1 or 2:1 (molar ratio) ester of oleic acid and decaglycerin, or a 1:1 or 2:1 (molar ratio) ester of stearic acid and decaglycerin.

[Surfactant S⁷]

In a case where the surfactant contains a cationic surfactant, such a cationic surfactant is preferably a surfactant S⁷.

The surfactant S⁷ is a cationic surfactant of a substituted ammonium salt type.

The surfactant S⁷ is preferably an ammonium salt wherein at least one hydrogen atom bonded to the nitrogen atom is substituted by an alkyl group, an alkenyl group or a POA chain having a terminal hydroxy group, more preferably a compound (S⁷¹).

$R^{21}$ is a hydrogen atom, a $C_{1-22}$ alkyl group, a $C_{2-22}$ alkenyl group, a $C_{1-9}$ fluoroalkyl group or a POA chain having a terminal hydroxy group.

Four $R^{21}$ may be the same or different, provided that four $R^{21}$ are not simultaneously hydrogen atoms.

$R^{21}$ is preferably a $C_{6-22}$ long chain alkyl group, a $C_{6-22}$ long chain alkenyl group or a $C_{1-9}$ fluoroalkyl group.

In a case where $R^{21}$ is an alkyl group other than the long chain alkyl group, $R^{21}$ is preferably a methyl group or an ethyl group.

In a case where $R^{21}$ is a POA chain having a terminal hydroxy group, the POA chain is preferably a POE chain.

$D^-$ is a counter ion.

$D^-$ is preferably a chloride ion, an ethyl sulfuric acid ion or an acetic acid ion.

The compound (S⁷¹) may, for example, be monostearyltrimethylammonium chloride, monostearyldimethylmonoethylammonium ethyl sulfuric acid salt, mono(stearyl)monomethyldi(polyethylene glycol)ammonium chloride, monofluorohexyltrimethylammonium chloride, di(tallow alkyl)dimethylammonium chloride or dimethyl mono coconut amine acetic acid salt.

[Surfactant S⁸]

In a case when the surfactant contains amphoteric surfactant, the amphoteric surfactant is preferably a surfactant S⁸.

The surfactant S⁸ is an alanine, an imidazolinium betaine, an amidebetaine or an acetic acid betaine.

The hydrophobic group is preferably a $C_{6-22}$ long chain alkyl group, a $C_{6-22}$ long chain alkenyl group or a $C_{1-9}$ fluoroalkyl group.

The surfactant S⁸ may, for example, be dodecyl betaine, stearyl betaine, dodecylcarboxymethylhydroxyethyl imidazolinium betaine, dodecydimethylaminoacetic acid betaine, or a fatty acid amidepropyldimethylaminoacetic acid betaine.

[Surfactant S⁹]

As the surfactant, a surfactant S⁹ may be used.

The surfactant S⁹ is a polymer surfactant made of a hydrophobic modified product of a block copolymer, random copolymer or hydrophilic copolymer of a hydrophilic monomer with a hydrocarbon type hydrophobic monomer and/or fluorinated hydrophobic monomer.

The surfactant S⁹ may, for example, be a block or random copolymer of a polyethylene glycol (meth)acrylate with a long chain alkyl acrylate, a block or random copolymer of a polyethylene glycol (meth)acrylate with a fluoro(meth)acrylate, a block or random copolymer of vinyl acetate with a long chain alkyl vinyl ether, a block or random copolymer of vinyl acetate with a long chain alkyl vinyl ester, a polymer of styrene with maleic anhydride, a condensate of a polyvinyl alcohol and stearic acid, a condensate of a polyvinyl alcohol and a stearyl mercaptan, a condensate of a polyallylamine and stearic acid, a condensate of a polyethyleneimine and stearyl alcohol, methylcellulose, hydroxypropylmethylcellulose or hydroxyethylmethylcellulose.

As commercial products of the surfactant S⁹, MP Polymer (product number: MP-103, MP-203) of Kuraray Co., Ltd., SMA resin of Elf Atochem Inc., METOLOSE of Shin-Etsu Chemical Co., Ltd., EPOMIN RP of NIPPON SHOKUBAI Co., Ltd., and Surflon (product number: S-381, S-393) of SEIMI CHEMICAL CO., LTD., may, for example, be mentioned.

In a case where the medium is an organic solvent, or the mixing ratio of an organic solvent is large, the surfactant S⁹ is preferably a surfactant S⁹¹.

Surfactant S⁹¹: a polymer surfactant made of a block copolymer or random copolymer (or a polyfluoroalkyl modified product thereof) of a lipophilic monomer and a fluorinated monomer.

The surfactant S⁹¹ may, for example, be a copolymer of an alkyl acrylate with a fluoro(meth)acrylate, or a copolymer of an alkyl vinyl ether with a fluoroalkyl vinyl ether.

As a commercial product of the surfactant S⁹¹, Surflon (product number: S-383, SC-100 series) of SEIMI CHEMICAL CO., LTD. may be mentioned.

From the viewpoint of excellent water and oil repellency of the oil repellent composition and the stability of the obtained emulsion, the combination of surfactants is preferably a combination of the surfactants S¹ and S⁷, a combination of the surfactants S¹, S² and S⁷, a combination of the surfactants S¹, S³ and S⁷ or a combination of the surfactants S¹, S², S³ and S⁷, more preferably the above combinations wherein the surfactant S⁷ is a compound (S⁷¹).

The copolymer of the present invention as described above, does not contain a constituting component having a high environmental burden, and by the presence of polymerized units (a) and polymerized units (b), high oil repellency is provided, and by the crosslinked structure of polymerized units (c1) and polymerized units (c2), high oil repellency particularly against oils having low surface tensions is provided.

<Oil Repellent Composition of the Present Invention>

The oil repellent composition of the present invention contains the copolymer of the present invention and a medium as essential components and, as the case requires, further contains a surfactant or an additive. The form of the oil repellent composition of the present invention is preferably such a form that the copolymer of the present invention is dissolved or dispersed as particles, in the medium.

The amount of the copolymer of the present invention contained in the oil repellent composition of the present invention is preferably from 0.05 to 10 mass %, more preferably from 0.1 to 5 mass %, based on the total amount of the composition, although it may depend also on the objective article. If the content of the copolymer is less than 0.05 mass %, the water and oil repellency may sometimes not adequately be provided, and also if it exceeds 10 mass %, the water and oil repellency tends not to be improved over a certain level.

The copolymer solution or dispersion of the present invention obtained by the above method may be used as it is, as raw material for the oil repellent composition, and in such a case, the copolymer concentration in the solution or dispersion is preliminarily measured by a usual method to adjust the oil repellent composition, whereby it is possible to adjust the copolymer concentration in the composition.

In a case where the copolymer is dispersed as particles in the oil repellent composition of the present invention, the average particle size of the copolymer is preferably from 10 to 1,000 nm, more preferably from 10 to 300 nm, particularly preferably from 10 to 250 nm. The adjustment of the particle size can be carried out by the method for producing the copolymer of the present invention or by a method described in the method for producing the oil repellent composition. When the average particle size is in such a range, it is not required to use a surfactant, dispersant, etc. in a large amount, the water and oil repellency is good, no color fading will result when a dyed cloth is treated, and the dispersed particles can be stably present without precipitation in the medium. The average particle size of the copolymer can be measured by a dynamic light scattering apparatus, an electron microscope or the like.

The medium contained in the oil repellent composition of the present invention is one to dissolve the copolymer of the present invention or to maintain it in a dispersed state, and its content is basically the entire amount of the oil repellent composition minus the amount of the copolymer and the amount of optional components. As the medium to be used, it is possible to use the same one as exemplified in the above described method for producing the compound of the present invention (in the solution polymerization or emulsion polymerization).

The oil repellent composition of the present invention contains a surfactant as an optional component. However, in a case where the oil repellent composition of the present invention is in such a form that the copolymer is dispersed as particles in the medium, a surfactant is an essential component to stabilize the dispersion system. In such a case, the content of the surfactant in the oil repellent composition is preferably from 1 to 15 parts by mass, per 100 parts by mass of the monomer mixture.

Further, as the surfactant to be used, it is possible to use the same one as exemplified in the above described method for producing the copolymer of the present invention (the emulsion polymerization).

The oil repellent composition of the present invention may contain various additives as the case requires.

Additives may, for example, be a penetrant, an anti-foaming agent, a water absorbent, an anti-static agent, an anti-stat polymer, an anti-crease agent, a softener, a film-forming aid, a water-soluble polymer (polyacrylamide, polyvinyl alcohol, etc.), a thermosetting agent (melamine resin, urethane resin, triazine ring-containing compound, isocyanate type compound, etc.), an epoxy curing agent (isophthalic acid dihydrazide, adipic acid dihydrazide, sebacic acid dihydrazide, dodecanedioic acid dihydrazide, 1,6-hexamethylene bis(N,N-dimethylsemicarbazide), 1,1,1',1'-tetramethyl-4,4'-(methylene-di-para-phenylene)disemicarbazide, spiroglycol, etc.), a thermosetting catalyst, a crosslinking catalyst, a synthetic resin, a fiber stabilizer, fine inorganic particles, etc.

Further, the oil repellent composition of the present invention may contain, as the case requires, a copolymer capable of providing water repellency and/or oil repellency other than the copolymer of the present invention (e.g. a copolymer containing a large amount of structural units based on the monomer (A), a commercial water repellent agent, a commercial oil repellent agent, a commercial water and oil repellent agent, a commercial SR (soil release) agent, etc.), a water-repellent compound having no fluorine atom, etc. Such a water repellent compound having no fluorine atom may, for example, be a paraffin compound, an aliphatic amide compound, an alkylethylene urea compound or a silicon compound.

Further, by the oil repellent composition of the present invention, the content (the content when the solid content concentration is 20%) of perfluorooctanoic acid (PFOA), perfluorooctane sulfonic acid (PFOS), their precursors and their analogues, environmental impact of which has been pointed out, can be reduced to a level lower than the detection limit as an analytical value of LC-MS/MS by the method disclosed in Japanese Patent Application No. 2007-333564.

The oil repellent composition of the present invention is produced by the following method (i), (ii), (iii) or (iv).

(i) A method wherein in the presence of a polymerization initiator, a monomer mixture comprising the monomer (A), the monomer (B), the monomer (C1) and the monomer (C2) and as the case requires, containing the monomer (D), is polymerized in a medium to obtain a solution or dispersion of the copolymer, and then, as the case requires, other media or additives are added (ii) A method wherein in the presence of a polymerization initiator, a monomer mixture comprising the monomer (A), the monomer (B), the monomer (C1) and the monomer (C2) and as the case requires, containing the monomer (D), is polymerized in a medium to obtain a solution or dispersion of the copolymer, and then the copolymer is separated, and to the copolymer, a medium, a surfactant and optional additives are added.

(iii) A method wherein in the presence of a surfactant and a polymerization initiator, a monomer mixture comprising the monomer (A), the monomer (B), the monomer (C1) and the monomer (C2) and as the case requires, containing the monomer (D), is polymerized in a medium to obtain a solution, dispersion or emulsion of the copolymer, and then, as the case requires, other media, other surfactants or additives are added.

(iv) A method wherein in the presence of a surfactant and a polymerization initiator, a monomer mixture comprising the monomer (A), the monomer (B), the monomer (C1) and the monomer (C2) and as the case requires, containing the monomer (D), is polymerized in a medium to obtain a solution, dispersion or emulsion of the copolymer, and then, the copolymer is separated, and to the copolymer, a medium, a surfactant and optional additives are added.

The polymerization of the monomer mixture may be carried out in the same manner as the polymerization in the above described method for producing the copolymer.

In a case where the copolymer is dissolved in the medium, the concentration of a copolymer is adjusted to be from 20 to 40 mass % in the solution (100 mass %) according to a preferred method for producing the copolymer.

Further, in a case where the copolymer is dispersed as particles, the solid content concentration in the dispersion or emulsion is adjusted to be from 20 to 40 mass % in the dispersion or emulsion (100 mass %) according to a preferred method of the copolymer. Here, such a solid content concentration is a concentration including a surfactant (emulsifying agent) in addition to the copolymer. The proportion of the copolymer in the dispersion or emulsion is adjusted to be from 18 to 40 mass % according to a preferred method of the copolymer. If the content of the copolymer is less than 18 mass %, the productivity may sometimes be poor, and if it exceeds 40 mass %, the stability may sometimes be poor.

Here, the solid content concentration in the dispersion is calculated from the mass of the dispersion before heating and the mass after drying for 4 hours in a counter current canal dryer at 120° C. Further, the concentration of the copolymer can be calculated from the solid content concentration and the charged amounts of the respective raw material components, the residual amounts of the monomers, etc.

In order to use the copolymer solution or dispersion obtained by the method for producing a copolymer of the present invention as the oil repellent composition of the present invention, the concentration of the copolymer may be adjusted to a preferred concentration as the oil repellent composition i.e. from 0.05 to 10 mass %, more preferably from 0.1 to 5 mass %, by adding a diluting component, etc. as the case requires.

In a case where the oil repellent composition of the present invention is in the form of a dispersion, a common method may be employed such that the copolymer or a solution, dispersion or the like containing the copolymer, the surfactant and optional components are weighed and uniformly stirred together with a proper amount of a solvent by a homomixer, a high pressure emulsifier or the like to obtain a dispersion.

Further, in order to disperse the copolymer with a particle size within the above described preferred range, conditions such as the type and amount of the surfactant, the rotational speed of the homomixer, the pressure during the high pressure emulsification, etc. may be adjusted. Usually, the particle size of the copolymer tends to be small (large), when the dispersion is prepared under such conditions that the amount of the surfactant is large (small), the rotational speed of the homomixer is high (low) and the pressure during the high pressure emulsification is high (low).

The above described oil repellent composition of the present invention does not contain a constituting component having a high environmental burden, and by the presence of the polymerized units (a) and the polymerized units (b), high oil repellency is provided, and by the crosslinked structure of the polymerized units (c1) and the polymerized units (c2), high oil repellency particularly against oils of low surface tensions is provided.

<Article of the Invention>

The article of the present invention is an article treated with the oil repellent composition of the present invention.

The article to be treated with the oil repellent composition of the present invention may, for example, be fibers (natural fibers, synthetic fibers, blended fibers, etc.), various fiber products, non-woven fabrics, resins, paper, leather, metal, stone, concrete, plaster, glass, etc.

A treating method may, for example, be a method wherein an article is coated or impregnated with the oil repellent composition by a known coating method, followed by drying.

By the treatment of an article with the oil repellent composition of the present invention, it is possible to impart oil repellency of high quality with little environmental burden, particularly sufficient oil repellency against oils having low surface tensions, to the article with durability. Further, it is excellent in adhesion on the surface, and the oil repellency can be imparted even by curing at a low temperature.

The above-described article of the present invention does not contain a material having a high environmental burden and is excellent in oil repellency, particularly oil repellency against oils of low surface tensions.

EXAMPLES

Now, the present invention will be described in detail with reference to Examples, Comparative Examples and Reference Examples. However, it should be understood that the present invention is by no means thereby restricted. In Tables, symbols (A) to (C2) for monomers represent that the monomers are within the respective scopes of the above mentioned monomers (A) to (C2), and other monomers are represented by symbol (D).

Examples 1 to 20

Copolymers of Examples 1 to 20 were prepared by the following method (solution polymerization) by using, as the monomer (A), $C_6F_{13}C_2H_4OCOCH{=}CH_2$ (monomer (A1)).

Into a 30 mL glass ampoule for polymerization, monomers (A) to (D) in the amounts shown in Table 1 for each Example and, as a polymerization initiator, 2,2'-azobis(2,4-dimethylvaleronitrile) in the amount shown in Table 1 for each Example, were introduced, and, as a solvent, 24 g of dichloropentafluoropropane (tradename AK-225, manufactured by Asahi Glass Company, Limited) was introduced. The gas in the ampoule was replaced with nitrogen gas, and then, the ampoule was closed and maintained in a hot water bath at 50° C. for 16 hours to obtain a reaction solution containing a copolymer.

From the gas chromatography (GC) of the reaction crude solution after completion of the reaction, unreacted polymerizable monomers were not substantially detected, and all polymerizable monomers were found to have reacted.

Comparative Examples 1 to 16

Copolymers of Comparative Examples 1 to 16 not containing one of the essential constituting components of the copolymer of the present invention were prepared by the following method (solution polymerization) by using, as the monomer (A), $C_6F_{13}C_2H_4OCOCH{=}CH_2$ (monomer (A1)).

A copolymer reaction solution was obtained by carrying out a polymerization reaction in the same manner as in Examples 1 to 20 except that the monomers shown in Table 1 for each Comparative Example and a polymerization initiator (2,2'-azobis(2,4-dimethylvaleronitrile)) were used it the amounts shown in Table 1 for each Comparative Example. From the gas chromatography (GC) of the reaction crude solution after completion of the reaction, unreacted polymerizable monomers were not substantially detected, and all polymerizable monomers were found to have reacted.

TABLE 1

| | Ex. No | Monomer (A1) | | Monomer (B) | | | Monomer (C1) | | | Monomer (C2) | | | Monomer (D) | | | Polymerization initiator | |
|---|---|---|---|---|---|---|---|---|---|---|---|---|---|---|---|---|---|
| | | Mass (g) | mol % | Compound code | Mass (g) | mol % | Compound code | Mass (g) | mol % | Compound code | Mass (g) | mol % | Compound code | Mass (g) | mol % | Mass (g) | mol % |
| Ex. | 1 | 4.084 | 47.0 | HMA | 1.663 | 47.0 | HEA | 0.097 | 4.0 | 35DPBI | 0.104 | 2.0 | | | | 0.052 | 1.0 |
| | 2 | 4.691 | 60.0 | HMA | 1.082 | 34.0 | HEA | 0.087 | 4.0 | 35DPBI | 0.094 | 2.0 | | | | 0.046 | 1.0 |
| | 3 | 4.319 | 55.0 | 2EHMA | 1.452 | 39.0 | HEA | 0.087 | 4.0 | 35DPBI | 0.094 | 2.0 | | | | 0.047 | 1.0 |
| | 4 | 4.555 | 60.0 | 2EHMA | 1.224 | 34.0 | HEA | 0.084 | 4.0 | 35DPBI | 0.091 | 2.0 | | | | 0.045 | 1.0 |
| | 5 | 4.776 | 65.0 | 2EHMA | 1.010 | 29.0 | HEA | 0.082 | 4.0 | 35DPBI | 0.088 | 2.0 | | | | 0.044 | 1.0 |
| | 6 | 4.983 | 70.0 | 2EHMA | 0.810 | 24.0 | HEA | 0.079 | 4.0 | 35DPBI | 0.086 | 2.0 | | | | 0.042 | 1.0 |
| | 7 | 5.360 | 80.0 | 2EHMA | 0.445 | 14.0 | HEA | 0.074 | 4.0 | 35DPBI | 0.081 | 2.0 | | | | 0.040 | 1.0 |
| | 8 | 4.540 | 60.0 | 2EHMA | 1.220 | 34.0 | 4HBA | 0.104 | 4.0 | 35DPBI | 0.091 | 2.0 | | | | 0.045 | 1.0 |

TABLE 1-continued

| | | Monomer (A1) | | Monomer (B) | | | Monomer (C1) | | | Monomer (C2) | | | Monomer (D) | | | Polymerization initiator | |
|---|---|---|---|---|---|---|---|---|---|---|---|---|---|---|---|---|---|
| | Ex. No | Mass (g) | mol % | Compound code | Mass (g) | mol % | Compound code | Mass (g) | mol % | Compound code | Mass (g) | mol % | Compound code | Mass (g) | mol % | Mass (g) | mol % |
| | 9 | 4.510 | 60.0 | 2EHMA | 1.212 | 34.0 | CHDMMA | 0.143 | 4.0 | 35DPBI | 0.090 | 2.0 | | | | 0.045 | 1.0 |
| | 10 | 4.547 | 60.0 | 2EHMA | 1.222 | 34.0 | HEMA | 0.094 | 4.0 | 35DPBI | 0.091 | 2.0 | | | | 0.045 | 1.0 |
| | 11 | 4.578 | 60.0 | 2EHMA | 1.158 | 32.0 | HEA | 0.127 | 6.0 | 35DPBI | 0.092 | 2.0 | | | | 0.045 | 1.0 |
| | 12 | 4.601 | 60.0 | 2EHMA | 1.091 | 30.0 | HEA | 0.170 | 8.0 | 35DPBI | 0.092 | 2.0 | | | | 0.046 | 1.0 |
| | 13 | 4.665 | 65.0 | iDMA | 1.127 | 29.0 | HEA | 0.080 | 4.0 | 35DPBI | 0.086 | 2.0 | | | | 0.043 | 1.0 |
| | 14 | 4.889 | 70.0 | iDMA | 0.907 | 24.0 | HEA | 0.078 | 4.0 | 35DPBI | 0.084 | 2.0 | | | | 0.041 | 1.0 |
| | 15 | 4.088 | 47.0 | HMA | 1.239 | 35.0 | HEA | 0.097 | 4.0 | 35DPBI | 0.105 | 2.0 | CHMA | 0.420 | 12.0 | 0.052 | 1.0 |
| | 16 | 4.091 | 47.0 | HMA | 0.833 | 23.5 | HEA | 0.097 | 4.0 | 35DPBI | 0.105 | 2.0 | CHMA | 0.823 | 23.5 | 0.052 | 1.0 |
| | 17 | 4.336 | 55.0 | 2EHMA | 1.308 | 35.0 | HEA | 0.088 | 4.0 | 35DPBI | 0.095 | 2.0 | CHMA | 0.127 | 4.0 | 0.047 | 1.0 |
| | 18 | 4.400 | 55.0 | 2EHMA | 0.740 | 19.5 | HEA | 0.089 | 4.0 | 35DPBI | 0.096 | 2.0 | CHMA | 0.628 | 19.5 | 0.048 | 1.0 |
| | 19 | 4.568 | 60.0 | 2EHMA | 1.119 | 31.0 | HEA | 0.085 | 4.0 | 35DPBI | 0.091 | 2.0 | CHMA | 0.092 | 3.0 | 0.045 | 1.0 |
| | 20 | 4.593 | 60.0 | 2EHMA | 0.908 | 25.0 | HEA | 0.085 | 4.0 | 35DPBI | 0.092 | 2.0 | CHMA | 0.277 | 9.0 | 0.045 | 1.0 |
| Comp Ex. | 1 | 4.733 | 47.0 | | | | HEA | 0.112 | 4.0 | 35DPBI | 0.121 | 2.0 | MA | 0.974 | 47.0 | 0.060 | 1.0 |
| | 2 | 4.611 | 47.0 | | | | HEA | 0.109 | 4.0 | 35DPBI | 0.118 | 2.0 | MMA | 1.104 | 47.0 | 0.058 | 1.0 |
| | 3 | 4.385 | 47.0 | | | | HEA | 0.104 | 4.0 | 35DPBI | 0.112 | 2.0 | BA | 1.344 | 47.0 | 0.051 | 1.0 |
| | 4 | 4.180 | 47.0 | | | | HEA | 0.099 | 4.0 | 35DPBI | 0.107 | 2.0 | THFA | 1.561 | 47.0 | 0.053 | 1.0 |
| | 5 | 4.085 | 47.0 | | | | HEA | 0.097 | 4.0 | 35DPBI | 0.104 | 2.0 | THFMA | 1.663 | 47.0 | 0.052 | 1.0 |
| | 6 | 4.194 | 47.0 | | | | HEA | 0.099 | 4.0 | 35DPBI | 0.107 | 2.0 | CHA | 1.547 | 47.0 | 0.053 | 1.0 |
| | 7 | 4.098 | 47.0 | | | | HEA | 0.097 | 4.0 | 35DPBI | 0.105 | 2.0 | CHMA | 1.649 | 47.0 | 0.052 | 1.0 |
| | 8 | 3.846 | 47.0 | | | | HEA | 0.091 | 4.0 | 35DPBI | 0.098 | 2.0 | IBorA | 1.916 | 47.0 | 0.049 | 1.0 |
| | 9 | 3.765 | 47.0 | | | | HEA | 0.089 | 4.0 | 35DPBI | 0.096 | 2.0 | IBorMA | 2.002 | 47.0 | 0.048 | 1.0 |
| | 10 | 4.180 | 47.0 | | | | HEA | 0.099 | 4.0 | 35DPBI | 0.107 | 2.0 | HA | 1.562 | 47.0 | 0.053 | 1.0 |
| | 11 | 3.993 | 47.0 | | | | HEA | 0.094 | 4.0 | 35DPBI | 0.102 | 2.0 | 2EHA | 1.760 | 47.0 | 0.050 | 1.0 |
| | 12 | | | 2EHMA | 5.926 | 100.0 | | | | | | | | | | 0.074 | 1.0 |
| | 13 | | | 2EHMA | 5.633 | 94.0 | HEA | 0.140 | 4.0 | 35DPBI | 0.152 | 2.0 | | | | 0.075 | 1.0 |
| | 14 | 4.702 | 64.0 | 2EHMA | 1.254 | 36.0 | | | | | | | | | | 0.044 | 1.0 |
| | 15 | 4.615 | 61.0 | 2EHMA | 1.256 | 35.0 | HEA | 0.084 | 4.0 | | | | | | | 0.045 | 1.0 |
| | 16 | 3.666 | 47.0 | | | | HEA | 0.087 | 4.0 | 35DPBI | 0.094 | 2.0 | LA | 2.107 | 47.0 | 0.046 | 1.0 |

Mol % for each monomer component in Table 1 shows the mol percentage (%) in all monomers (100 mol %), and mol % of a polymerization initiator shows the molar ratio (%) of the polymerization initiator to the total mol of all monomers.

Further, compound codes in Table 1 have the following meanings.

Monomer (B)
  HMA: n-Hexyl methacrylate
  2EHMA: 2-Ethylhexyl methacrylate
  iDMA: 2,4,6-Trimethylheptyl methacrylate Monomer (C1)
  HEA: 2-Hydroxyethyl acrylate
  4HBA: 4-Hydroxybutyl acrylate
  CHDMMA: 1,4-Cyclohexanedimethanol monoacrylate
  HEMA: 2-Hydroxyethyl methacrylate Monomer (C2)
  35DPBI: 3,5-Dimethylpyrazole adduct of 2-isocyanatoethyl methacrylate Monomer (D)
  MA: Methyl acrylate
  MMA: Methyl methacrylate
  BA: n-Butyl acrylate
  THFA: Tetrahydrofurfuryl acrylate
  THFMA: Tetrahydrofurfuryl methacrylate
  CHA: Cyclohexyl acrylate
  CHMA: Cyclohexyl methacrylate
  IBorA: Isobonyl acrylate
  IBorMA: Isobonyl methacrylate
  HA: n-Hexyl acrylate
  2EHA: 2-Ethylhexyl acrylate
  LA: Lauryl acrylate Examples 21 to 45

Copolymers of Examples 21 to 45 were prepared by the following method (solution polymerization) by using, as the monomer (A), $C_6F_{13}C_2H_4OCOC(CH_3)=CH_2$ (monomer (A2)).

A copolymer reaction solution was obtained by carrying out a polymerization reaction in the same manner as in Examples 1 to 20 except that the monomers shown in Table 2 for each Example and a polymerization initiator (2,2'-azobis (2,4-dimethylvaleronitrile) were used in the amounts shown in Table 2 for each Example. From the gas chromatography (GC) of the reaction crude solution after completion of the reaction, unreacted polymerizable monomers were not substantially detected, and all polymerizable monomers were found to have reacted.

Comparative Examples 17 to 37

Copolymers of Comparative Examples 17 to 37 not containing one of the essential constituting components of the compound of the present invention were prepared by the following method (solution polymerization) by using, as the monomer (A), $C_6F_{13}C_2H_4OCOC(CH_3)=CH_2$ (monomer (A2)).

A copolymer reaction solution was obtained by carrying out a polymerization reaction in the same manner as in Examples 1 to 20 except that the monomers shown in Table 2 for each Comparative Example and a polymerization initiator (2,2'-azobis(2,4-dimethylvaleronitrile)) were used in the amounts shown in Table 2 for each Comparative Example.

From the gas chromatography (GC) of the reaction crude solution after completion of the reaction, unreacted polymerizable monomers were not substantially detected, and all polymerizable monomers were found to have reacted.

TABLE 2

| | Ex No | Monomer (A2) Mass (g) | mol % | *2 | Monomer (B) Mass (g) | mol % | *2 | Mass (g) | mol % | Monomer (C1) *2 | Mass (g) | mol % |
|---|---|---|---|---|---|---|---|---|---|---|---|---|
| Ex | 21 | 4.037 | 47.0 | 2EHA | 1.721 | 47.0 | | | | HEA | 0.092 | 4.0 |
| | 22 | 4.037 | 47.0 | iOA | 1.721 | 47.0 | | | | HEA | 0.092 | 4.0 |
| | 23 | 3.461 | 40.0 | DeA | 2.296 | 54.0 | | | | HEA | 0.093 | 4.0 |
| | 24 | 3.868 | 47.0 | DeA | 1.900 | 47.0 | | | | HEA | 0.088 | 4.0 |
| | 25 | 3.295 | 40.0 | LA | 2.474 | 54.0 | | | | HEA | 0.089 | 4.0 |
| | 26 | 3.713 | 47.0 | LA | 2.065 | 47.0 | | | | HEA | 0.085 | 4.0 |
| | 27 | 4.151 | 55.0 | LA | 1.637 | 39.0 | | | | HEA | 0.081 | 4.0 |
| | 28 | 5.298 | 80.0 | LA | 0.516 | 14.0 | | | | HEA | 0.071 | 4.0 |
| | 29 | 3.700 | 47.0 | LA | 2.058 | 47.0 | | | | 4HBA | 0.105 | 4.0 |
| | 30 | 3.676 | 47.0 | LA | 2.045 | 47.0 | | | | CHDMMA | 0.144 | 4.0 |
| | 31 | 3.709 | 47.0 | LA | 2.062 | 47.0 | | | | HEMA | 0.095 | 4.0 |
| | 32 | 3.920 | 47.0 | LA | 0.742 | 16.0 | 2EHA | 1.103 | 31.0 | HEA | 0.090 | 4.0 |
| | 33 | 3.817 | 47.0 | LA | 1.400 | 31.0 | 2EHA | 0.554 | 16.0 | HEA | 0.087 | 4.0 |
| | 34 | 3.569 | 47.0 | MyA | 2.217 | 47.0 | | | | HEA | 0.082 | 4.0 |
| | 35 | 4.023 | 55.0 | MyA | 1.772 | 39.0 | | | | HEA | 0.079 | 4.0 |
| | 36 | 3.437 | 47.0 | CA | 2.358 | 47.0 | | | | HEA | 0.079 | 4.0 |
| | 37 | 3.902 | 55.0 | CA | 1.898 | 39.0 | | | | HEA | 0.076 | 4.0 |
| | 38 | 3.314 | 47.0 | StA | 2.488 | 47.0 | | | | HEA | 0.076 | 4.0 |
| | 39 | 3.314 | 47.0 | iStA | 2.488 | 47.0 | | | | HEA | 0.076 | 4.0 |
| | 40 | 4.151 | 55.0 | 2PHA | 1.637 | 39.0 | | | | HEA | 0.081 | 4.0 |
| | 41 | 4.405 | 60.0 | 2PHA | 1.388 | 34.0 | | | | HEA | 0.079 | 4.0 |
| | 42 | 3.882 | 50.0 | 2PHA | 0.475 | 11.0 | LA | 1.425 | 33.0 | HEA | 0.083 | 4.0 |
| | 43 | 3.314 | 47.0 | 2ODA | 2.488 | 47.0 | | | | HEA | 0.076 | 4.0 |
| | 44 | 4.243 | 63.0 | 2ODA | 1.568 | 31.0 | | | | HEA | 0.072 | 4.0 |
| | 45 | 3.777 | 50.0 | 2ODA | 0.624 | 11.0 | LA | 1.387 | 33.0 | HEA | 0.081 | 4.0 |
| Comp Ex. | 17 | 5.966 | 100.0 | | | | | | | | | |
| | 18 | 5.826 | 94.0 | | | | | | | HEA | 0.067 | 4.0 |
| | 19 | 4.766 | 47.0 | | | | | | | HEA | 0.109 | 4.0 |
| | 20 | 4.646 | 47.0 | | | | | | | HEA | 0.106 | 4.0 |
| | 21 | 4.423 | 47.0 | | | | | | | HEA | 0.101 | 4.0 |
| | 22 | 4.320 | 47.0 | | | | | | | HEA | 0.099 | 4.0 |
| | 23 | 4.222 | 47.0 | | | | | | | HEA | 0.097 | 4.0 |
| | 24 | 4.127 | 47.0 | | | | | | | HEA | 0.094 | 4.0 |
| | 25 | 4.235 | 47.0 | | | | | | | HEA | 0.097 | 4.0 |
| | 26 | 4.141 | 47.0 | | | | | | | HEA | 0.095 | 4.0 |
| | 27 | 3.892 | 47.0 | | | | | | | HEA | 0.089 | 4.0 |
| | 28 | 3.811 | 47.0 | | | | | | | HEA | 0.087 | 4.0 |
| | 29 | 4.127 | 47.0 | | | | | | | HEA | 0.094 | 4.0 |
| | 30 | 3.951 | 47.0 | | | | | | | HEA | 0.090 | 4.0 |
| | 31 | 3.789 | 47.0 | | | | | | | HEA | 0.087 | 4.0 |
| | 32 | | | LA | 5.939 | 100.0 | | | | | | |
| | 33 | | | LA | 5.694 | 94.0 | | | | HEA | 0.117 | 4.0 |
| | 34 | 3.827 | 50.0 | LA | 2.129 | 50.0 | | | | | | |
| | 35 | 3.640 | 47.0 | | | | | | | HEA | 0.083 | 4.0 |
| | 36 | 3.374 | 47.0 | | | | | | | HEA | 0.077 | 4.0 |
| | 37 | 3.092 | 47.0 | | | | | | | HEA | 0.071 | 4.0 |

| | Ex No | Monomer (C2) *2 | Mass (g) | mol % | Monomer (D) *2 | Mass (g) | mol % | *1 Mass (g) | mol % |
|---|---|---|---|---|---|---|---|---|---|
| Ex | 21 | 35DPBI | 0.100 | 2.0 | | | | 0.049 | 1.0 |
| | 22 | 35DPBI | 0.100 | 2.0 | | | | 0.049 | 1.0 |
| | 23 | 35DPBI | 0.101 | 2.0 | | | | 0.050 | 1.0 |
| | 24 | 35DPBI | 0.096 | 2.0 | | | | 0.047 | 1.0 |
| | 25 | 35DPBI | 0.096 | 2.0 | | | | 0.047 | 1.0 |
| | 26 | 35DPBI | 0.092 | 2.0 | | | | 0.045 | 1.0 |
| | 27 | 35DPBI | 0.088 | 2.0 | | | | 0.043 | 1.0 |
| | 28 | 35DPBI | 0.077 | 2.0 | | | | 0.038 | 1.0 |
| | 29 | 35DPBI | 0.092 | 2.0 | | | | 0.045 | 1.0 |
| | 30 | 35DPBI | 0.091 | 2.0 | | | | 0.045 | 1.0 |
| | 31 | 35DPBI | 0.092 | 2.0 | | | | 0.045 | 1.0 |
| | 32 | 35DPBI | 0.097 | 2.0 | | | | 0.048 | 1.0 |
| | 33 | 35DPBI | 0.094 | 2.0 | | | | 0.047 | 1.0 |
| | 34 | 35DPBI | 0.088 | 2.0 | | | | 0.044 | 1.0 |
| | 35 | 35DPBI | 0.085 | 2.0 | | | | 0.042 | 1.0 |
| | 36 | 35DPBI | 0.085 | 2.0 | | | | 0.042 | 1.0 |
| | 37 | 35DPBI | 0.083 | 2.0 | | | | 0.041 | 1.0 |
| | 38 | 35DPBI | 0.082 | 2.0 | | | | 0.041 | 1.0 |
| | 39 | 35DPBI | 0.082 | 2.0 | | | | 0.041 | 1.0 |
| | 40 | 35DPBI | 0.088 | 2.0 | | | | 0.043 | 1.0 |
| | 41 | 35DPBI | 0.085 | 2.0 | | | | 0.042 | 1.0 |
| | 42 | 35DPBI | 0.090 | 2.0 | | | | 0.045 | 1.0 |

TABLE 2-continued

|   |   |   | *1 | | | *2 | | | | |
|---|---|---|---|---|---|---|---|---|---|---|
|   | 43 | 35DPBI | 0.082 | 2.0 | | | | | 0.041 | 1.0 |
|   | 44 | 35DPBI | 0.078 | 2.0 | | | | | 0.039 | 1.0 |
|   | 45 | 35DPBI | 0.088 | 2.0 | | | | | 0.043 | 1.0 |
| Comp | 17 | | | | | | | | 0.034 | 1.0 |
| Ex. | 18 | 35DPBI | 0.072 | 2.0 | | | | | 0.036 | 1.0 |
|   | 19 | 35DPBI | 0.118 | 2.0 | | MA | 0.949 | 47.0 | 0.058 | 1.0 |
|   | 20 | 35DPBI | 0.115 | 2.0 | | MMA | 1.076 | 47.0 | 0.057 | 1.0 |
|   | 21 | 35DPBI | 0.109 | 2.0 | | BA | 1.312 | 47.0 | 0.053 | 1.0 |
|   | 22 | 35DPBI | 0.107 | 2.0 | | BMA | 1.421 | 47.0 | 0.053 | 1.0 |
|   | 23 | 35DPBI | 0.104 | 2.0 | | THFA | 1.526 | 47.0 | 0.052 | 1.0 |
|   | 24 | 35DPBI | 0.102 | 2.0 | | THFMA | 1.626 | 47.0 | 0.050 | 1.0 |
|   | 25 | 35DPBI | 0.105 | 2.0 | | CHA | 1.511 | 47.0 | 0.052 | 1.0 |
|   | 26 | 35DPBI | 0.102 | 2.0 | | CHMA | 1.612 | 47.0 | 0.051 | 1.0 |
|   | 27 | 35DPBI | 0.096 | 2.0 | | IBorA | 1.876 | 47.0 | 0.048 | 1.0 |
|   | 28 | 35DPBI | 0.094 | 2.0 | | IBorMA | 1.961 | 47.0 | 0.047 | 1.0 |
|   | 29 | 35DPBI | 0.102 | 2.0 | | HMA | 1.626 | 47.0 | 0.050 | 1.0 |
|   | 30 | 35DPBI | 0.098 | 2.0 | | 2EHMA | 1.813 | 47.0 | 0.048 | 1.0 |
|   | 31 | 35DPBI | 0.094 | 2.0 | | IDMA | 1.984 | 47.0 | 0.046 | 1.0 |
|   | 32 | | | | | | | | 0.061 | 1.0 |
|   | 33 | 35DPBI | 0.127 | 2.0 | | | | | 0.063 | 1.0 |
|   | 34 | | | | | | | | 0.044 | 1.0 |
|   | 35 | 35DPBI | 0.090 | 2.0 | | LMA | 2.143 | 47.0 | 0.045 | 1.0 |
|   | 36 | 35DPBI | 0.083 | 2.0 | | CMA | 2.424 | 47.0 | 0.041 | 1.0 |
|   | 37 | 35DPBI | 0.076 | 2.0 | | BeA | 2.723 | 47.0 | 0.038 | 1.0 |

*1: Polymerization initiator
*2: Compound code

The mol % of each monomer component in Table 2 shows the mol percentage (%) in all monomers (100 mol %), and the mol % of the polymerization initiator shows the molar ratio (%) of the polymerization initiator to the total mol of all monomers.

Further, the compound codes in Table 2 have the following meanings. Here, among the compound codes in Table 2, with respect to the same ones as the codes used in Table 1, reference should be made to the description of the codes for Table 1 (irrespective of the classification of monomers, the same codes are used for the same compounds).

Monomer (B)
 iOA: 6-Methylheptyl acrylate
 DeA: Decyl acrylate
 MyA: Myristyl acrylate
 CA: Cetyl acrylate
 StA: Stearyl acrylate
 iStA: 16-Methylheptadecyl acrylate
 2PHA: 2-Pentylheptyl acrylate
 2ODA: 2-Octyldecyl acrylate Monomer (D)
 BMA: n-Butyl methacrylate
 LMA: Lauryl methacrylate
 CMA: Cetyl methacrylate
 BeA: Behenyl acrylate <Evaluation>

Each of the copolymer reaction solution obtained in the above Examples 1 to 45 and Comparative Examples 1 to 37, was diluted with the above AK-225 to obtain a treating liquid having a copolymer concentration of 1.0 mass %. Then, in accordance with the following method, a coating film was formed on a glass plate by using each treating liquid, and evaluation of the water and oil repellency of the coating film was carried out. The evaluation results are shown in Table 3 with respect to Examples and Comparative Examples having the compositions shown in Table 1 and in Table 4 with respect to Examples and Comparative Examples having the compositions shown in Table 2.

[Evaluation Method]

Using a cleaned glass plate as a substrate, the treating liquid obtained as described above, was applied thereon by a spin coating method for 10 seconds under a condition of 1,000 rpm. Then, by heat treatment at 120° C. for 60 minutes, a coating film was formed to obtain a test plate. With respect to all of the above treating liquids, test plates having such coating films formed by using them, were prepared. By using each test plate thus obtained, contact angles of water, n-hexadecane and n-octane on such a coating film were measured, and thus, water and oil repellency of the coating film obtained from the treating liquid containing the copolymer prepared in each of the above Examples and Comparative Examples was evaluated. Here, the measurement of the contact angles was carried out by using CA-X manufactured by KYOWA INTERFACE SCIENCE CO., LTD. As a result, together with the actually measured values of the contact angles, the results evaluated in accordance with the following standards are shown.

The water repellency was evaluated in three grades based on the contact angle of water being 100°.

⊚ (contact angle of at least 110°): excellent water repellency

○ (contact angle of at least 100° and less than 110°): adequate water repellency x (contact angle of less than 100°): inadequate water repellency The oil repellency, particularly the oil repellency against oils having relatively high surface tensions, was evaluated in three grades based on the contact angle of n-hexadecane being 65°.

⊚ (contact angle of at least 70°): excellent n-hexadecane oil repellency

○ (contact angle of at least 65° and less than 70°): adequate n-hexadecane oil repellency x (contact angle of less than 65°): inadequate n-hexadecane oil repellency The oil repellency, particularly the oil repellency against oils having low surface tensions, was evaluated in three grades based on the contact angle of n-octane being 60°.

⊚ (contact angle of at least 65°): excellent n-octane oil repellency

○ (contact angle of at least 60° and less than 65°): adequate n-octane oil repellency x (contact angle of less than 60°): inadequate n-octane oil repellency

TABLE 3

| Ex. No | | Contact angle (°) Water (Surface tension: 72.0 mN/m) | Evaluation | Contact angle (°) n-Hexadecane (Surface tension: 27.3 mN/m) | Evaluation | Contact angle (°) n-Octane (Surface tension: 21.8 mN/m) | Evaluation |
|---|---|---|---|---|---|---|---|
| Ex. | 1 | 113.1 | ⊚ | 84.3 | ⊚ | 65.8 | ⊚ |
| | 2 | 105.3 | ○ | 78.5 | ⊚ | 65.2 | ⊚ |
| | 3 | 113.4 | ⊚ | 89.0 | ⊚ | 61.7 | ○ |
| | 4 | 103.1 | ○ | 84.5 | ⊚ | 66.1 | ⊚ |
| | 5 | 113.0 | ⊚ | 89.4 | ⊚ | 66.1 | ⊚ |
| | 6 | 111.9 | ⊚ | 81.4 | ⊚ | 65.3 | ⊚ |
| | 7 | 110.1 | ⊚ | 86.2 | ⊚ | 63.6 | ○ |
| | 8 | 104.8 | ○ | 74.3 | ⊚ | 65.6 | ⊚ |
| | 9 | 103.2 | ○ | 77.9 | ⊚ | 61.9 | ○ |
| | 10 | 103.9 | ○ | 75.4 | ⊚ | 62.5 | ○ |
| | 11 | 114.3 | ⊚ | 75.2 | ⊚ | 65.5 | ⊚ |
| | 12 | 113.9 | ⊚ | 76.7 | ⊚ | 65.6 | ⊚ |
| | 13 | 106.7 | ○ | 85.3 | ⊚ | 68.1 | ⊚ |
| | 14 | 117.2 | ⊚ | 86.6 | ⊚ | 69.1 | ⊚ |
| | 15 | 101.8 | ○ | 72.1 | ⊚ | 65.2 | ⊚ |
| | 16 | 103.5 | ○ | 70.4 | ⊚ | 64.0 | ○ |
| | 17 | 113.1 | ⊚ | 79.9 | ⊚ | 62.4 | ○ |
| | 18 | 103.1 | ○ | 76.9 | ⊚ | 66.6 | ⊚ |
| | 19 | 105.1 | ○ | 67.4 | ○ | 66.2 | ⊚ |
| | 20 | 107.7 | ○ | 73.0 | ⊚ | 66.1 | ⊚ |
| Comp. Ex. | 1 | 106.2 | ○ | 74.9 | ⊚ | 56.9 | X |
| | 2 | 95.7 | X | 75.0 | ⊚ | 53.9 | X |
| | 3 | 103.0 | ○ | 74.0 | ⊚ | 57.4 | X |
| | 4 | 96.7 | X | 73.8 | ⊚ | 58.6 | X |
| | 5 | 98.5 | X | 77.2 | ⊚ | 55.5 | X |
| | 6 | 96.5 | X | 69.7 | ○ | 54.2 | X |
| | 7 | 95.8 | X | 73.5 | ⊚ | 59.4 | X |
| | 8 | 86.6 | X | 67.0 | ○ | 50.4 | X |
| | 9 | 96.0 | X | 69.9 | ○ | 50.4 | X |
| | 10 | 112.0 | ⊚ | 76.8 | ⊚ | 46.9 | X |
| | 11 | 106.3 | ○ | 76.9 | ⊚ | 41.0 | X |
| | 12 | 93.2 | X | 21.1 | X | 10.6 | X |
| | 13 | 92.2 | X | 14.9 | X | <5 | X |
| | 14 | 110.6 | ⊚ | 82.9 | ⊚ | 25.5 | X |
| | 15 | 107.5 | ○ | 80.4 | ⊚ | 24.4 | X |
| | 16 | 117.9 | ⊚ | 73.0 | ○ | 18.2 | X |

TABLE 4

| Ex. No | | Contact angle (°) Water (Surface tension: 72.0 dyn/cm) | Evaluation | Contact angle (°) n-Hexadecane (Surface tension: 27.3 mN/m) | Evaluation | Contact angle (°) n-Octane (Surface tension: 21.8 dyn/cm) | Evaluation |
|---|---|---|---|---|---|---|---|
| Ex. | 21 | 103.9 | ○ | 71.8 | ⊚ | 60.1 | ○ |
| | 22 | 104.1 | ○ | 70.9 | ⊚ | 60.4 | ○ |
| | 23 | 107.6 | ○ | 73.5 | ⊚ | 67.4 | ⊚ |
| | 24 | 103.8 | ○ | 72.9 | ⊚ | 66.3 | ⊚ |
| | 25 | 112.9 | ⊚ | 69.7 | ○ | 62.8 | ○ |
| | 26 | 116.6 | ⊚ | 72.0 | ⊚ | 65.6 | ⊚ |
| | 27 | 106.3 | ○ | 70.9 | ⊚ | 62.3 | ○ |
| | 28 | 109.9 | ○ | 71.6 | ⊚ | 62.8 | ○ |
| | 29 | 106.4 | ○ | 78.2 | ⊚ | 64.7 | ○ |
| | 30 | 105.3 | ○ | 71.5 | ⊚ | 61.3 | ○ |
| | 31 | 103.4 | ○ | 66.1 | ○ | 60.0 | ○ |
| | 32 | 104.4 | ○ | 69.5 | ○ | 60.4 | ○ |
| | 33 | 104.6 | ○ | 70.1 | ⊚ | 61.6 | ○ |
| | 34 | 111.1 | ⊚ | 68.6 | ○ | 60.9 | ○ |
| | 35 | 104.5 | ○ | 70.4 | ⊚ | 60.1 | ○ |
| | 36 | 104.7 | ○ | 75.6 | ⊚ | 71.6 | ⊚ |
| | 37 | 104.6 | ○ | 72.9 | ⊚ | 68.0 | ⊚ |
| | 38 | 105.0 | ○ | 71.8 | ⊚ | 69.7 | ⊚ |
| | 39 | 106.3 | ○ | 69.2 | ○ | 62.5 | ○ |
| | 40 | 104.8 | ○ | 70.1 | ⊚ | 62.4 | ○ |
| | 41 | 102.3 | ○ | 71.1 | ⊚ | 63.3 | ○ |
| | 42 | 104.4 | ○ | 69.8 | ○ | 62.2 | ○ |
| | 43 | 108.8 | ○ | 77.6 | ⊚ | 69.1 | ⊚ |
| | 44 | 104.5 | ○ | 72.3 | ⊚ | 67.1 | ⊚ |
| | 45 | 105.9 | ○ | 73.6 | ⊚ | 66.1 | ⊚ |
| Comp. Ex. | 17 | 109.0 | ○ | 72.8 | ⊚ | 57.2 | X |
| | 18 | 108.7 | ○ | 71.8 | ⊚ | 57.1 | X |
| | 19 | 104.2 | ○ | 70.5 | ⊚ | 55.7 | X |
| | 20 | 102.5 | ○ | 68.1 | ○ | 50.6 | X |
| | 21 | 104.6 | ○ | 71.5 | ⊚ | 52.4 | X |
| | 22 | 106.3 | ○ | 65.3 | ○ | 48.1 | X |
| | 23 | 99.5 | X | 70.9 | ⊚ | 51.6 | X |
| | 24 | 94.7 | X | 65.7 | ○ | 51.0 | X |
| | 25 | 97.7 | X | 68.2 | ○ | 49.1 | X |
| | 26 | 104.8 | ○ | 63.5 | X | 46.0 | X |
| | 27 | 104.5 | ○ | 66.9 | ○ | 49.8 | X |
| | 28 | 101.5 | ○ | 59.4 | X | 40.4 | X |
| | 29 | 107.7 | ○ | 66.8 | ○ | 53.3 | X |
| | 30 | 105.3 | ○ | 64.3 | X | 49.0 | X |
| | 31 | 106.1 | ○ | 65.2 | ○ | 58.2 | X |
| | 32 | 103.2 | ○ | 11.4 | X | <5 | X |
| | 33 | 101.0 | ○ | 6.7 | X | <5 | X |
| | 34 | 103.9 | ○ | 80.4 | ⊚ | 56.9 | X |
| | 35 | 105.3 | ○ | 67.3 | ○ | 59.1 | X |
| | 36 | 109.3 | ○ | 79.2 | ⊚ | 51.9 | X |
| | 37 | 106.5 | ○ | 68.5 | ○ | 58.1 | X |

From these results, it is evident that with the treating liquid (the oil repellent composition) containing the copolymer of the present invention, it is possible to prepare a coating film having high oil repellency against an oil having a low surface tension, as compared with the treating liquid (the oil repellent composition) containing the copolymer of a Comparative Example not containing one of the constituting components of the copolymer of the present invention. Further, by using the treating liquid (the oil repellent composition) containing the copolymer of the present invention, it is possible to impart adequate water repellency to an article, and the environmental burden is also low.

Examples 46 to 66

Copolymers of Examples 46 to 66 were prepared by the following method (emulsion polymerization) by using, as the monomer (A), the monomer (A1) or the monomer (A2).

Into a 300 mL glass beaker, monomers (A) to (D) in the amounts shown in Table 5 and the surfactant, deionized water, organic solvent and molecular weight-controlling agent in the amounts shown in Table 6 were introduced, and after heating at 50° C. for 30 minutes, mixed by means of a homomixer (BIO MIXER, manufactured by NIHONSEIKI KAISHA LTD.) to obtain a mixed liquid.

The obtained mixed liquid was treated by means of a high pressure emulsifier (Mini-Lab, manufactured by APV RANNIE) under 40 MPa while the temperature was maintained at 50° C., to obtain an emulsion. 70 g of the obtained emulsion was put into a 100 mL glass ampoule and cooled to at most 30° C. The gas phase was replaced by nitrogen, and the polymerization initiator was added in the amount shown in Table 6, and a polymerization reaction was carried out at 60° C. for 12 hours while shaking, to obtain an emulsion having the solid content concentration shown in Table 6.

Further, from GC of the reaction crude liquid after completion of the reaction, unreacted polymerizable monomers were not substantially detected, and all polymerizable monomers were found to have reacted.

<Molecular Weight of Copolymer>

With respect to a part of the copolymer obtained in each of the above Examples 46 to 66, the molecular weight was measured. That is, 5 g of the emulsion was dropwise added to 50 g of 2-propanol (hereinafter referred to as IPA), followed by stirring to precipitate a solid. After centrifugal separation at 3,000 rpm for 5 minutes, the obtained solid was decanted. Again, 12 g of IPA was added, followed by thorough stirring. After centrifugal separation at 3,000 rpm for 5 minutes, the obtained solid was separated from the supernatant liquid and vacuum-dried at 35° C. overnight to obtain a copolymer. The molecular weight of the recovered copolymer was measured by GPC. The mass average molecular weight (Mw) of the obtained copolymer is shown in Table 6.

Here, the measurement of the above average molecular weight (Mw) was carried out by the following GPC measuring method B.

(GPC Measuring Method)

The recovered copolymer was dissolved in a solvent mixture of fluorinated solvent (AK-225, manufactured by Asahi Glass Company, Limited)/THF=6/4 (volume ratio) to obtain a 1 mass % solution, which was passed through a filter of 0.2 μm to obtain a sample for analysis. With respect to the sample, the number average molecular weight (Mn) and the mass average molecular weight (Mw) were measured. The measuring conditions were as follows.

Apparatus: HLC-8220GPC, manufactured by TOSOH CORPORATION

Column: MIXED-C and 100A connected in series, manufactured by Polymer laboratories Temperature for measurement: 37° C.

Injected amount: 50 μL

Outlet velocity: 1 mL/min

Standard sample: EasiCal PM-2, manufactured by Polymer laboratories

Eluent: Solvent mixture of fluorinated solvent (AK-225 manufactured by Asahi Glass Company, Limited)/THF=6/4 (volume ratio)

Copolymers of Comparative Examples 38 to 43 not containing one of the essential constituting components of the copolymer of the present invention, were prepared by the following method (emulsion polymerization) by using, as the monomer (A), the monomer (A1) or the monomer (A2).

An emulsion having the solid content concentration shown in Table 6 was obtained by carrying out a polymerization reaction in the same manner as in Example 46 to 66 except that the monomers shown in Table 5 for each Comparative Example, and the surfactant, deionized water, organic solvent, molecular weight-controlling agent and polymerization initiator shown in Table 6 for each Comparative Example, were used in the amounts shown in Tables 5 and 6 for each Comparative Example. Further, from GC of the reaction crude solution after completion of the reaction, unreacted polymerizable monomers were not substantially detected, and all polymerizable monomers were found to have reacted. Further, with respect to the copolymers obtained in Comparative Examples 41 to 43 among them, measurement of the Molecular weights was carried out in the same manner as in the above Examples. The mass average molecular weights (Mw) of the obtained copolymers are shown in Table 6.

TABLE 5

| | Ex No | Monomer (A) | | | Monomer (B) | | | Monomer (C1) | | | Monomer (C2) | | | Monomer (D) | | |
|---|---|---|---|---|---|---|---|---|---|---|---|---|---|---|---|---|
| | | Compound code | Mass (g) | mol % | Compound code | Mass (g) | mol % | Compound code | Mass (g) | mol % | Compound code | Mass (g) | mol % | Compound code | Mass (g) | mol % |
| Ex. | 46 | C6FA | 22.92 | 59.3 | 2EHMA | 6.33 | 34.5 | HEA | 0.45 | 4.2 | 35DPBI | 0.45 | 1.9 | | | |
| | 47 | C6FA | 23.52 | 64.5 | iDMA | 5.73 | 29.0 | HEA | 0.45 | 4.5 | 35DPBI | 0.45 | 2.1 | | | |
| | 48 | C6FMA | 21.11 | 49.5 | iOA | 8.14 | 44.8 | HEA | 0.45 | 3.9 | 35DPBI | 0.45 | 1.8 | | | |
| | 49 | C6FMA | 17.19 | 46.2 | CA | 12.06 | 47.2 | HEA | 0.45 | 4.5 | 35DPBI | 0.45 | 2.1 | | | |
| | 50 | C6FMA | 18.69 | 46.6 | LA | 10.55 | 47.3 | HEA | 0.45 | 4.2 | 35DPBI | 0.45 | 1.9 | | | |
| | 51 | C6FMA | 19.60 | 49.7 | LA | 9.65 | 44.0 | HEA | 0.45 | 4.3 | 35DPBI | 0.45 | 2.0 | | | |
| | 52 | C6FMA | 19.00 | 48.0 | LA | 10.55 | 47.9 | HEA | 0.30 | 2.8 | 35DPBI | 0.30 | 1.3 | | | |
| | 53 | C6FMA | 18.54 | 45.4 | LA | 10.40 | 45.8 | HEA | 0.75 | 6.9 | 35DPBI | 0.45 | 1.9 | | | |
| | 54 | C6FMA | 18.54 | 46.1 | LA | 10.40 | 46.5 | HEA | 0.45 | 4.2 | 35DPBI | 0.75 | 3.2 | | | |
| | 55 | C6FMA | 22.93 | 46.6 | LA | 12.95 | 47.3 | HEA | 0.55 | 4.2 | 35DPBI | 0.55 | 1.9 | | | |
| | 56 | C6FMA | 22.93 | 46.6 | LA | 12.94 | 47.3 | HEA | 0.55 | 4.2 | 35DPBI | 0.55 | 1.9 | | | |
| | 57 | C6FMA | 22.93 | 46.6 | LA | 12.94 | 47.3 | HEA | 0.55 | 4.2 | 35DPBI | 0.55 | 1.9 | | | |
| | 58 | C6FMA | 22.28 | 46.6 | LA | 12.58 | 47.3 | HEA | 0.54 | 4.2 | 35DPBI | 0.54 | 1.9 | | | |
| | 59 | C6FMA | 22.36 | 46.6 | LA | 12.62 | 47.3 | HEA | 0.54 | 4.2 | 35DPBI | 0.54 | 1.9 | | | |
| | 60 | C6FMA | 21.20 | 46.6 | LA | 11.97 | 47.3 | HEA | 0.51 | 4.2 | 35DPBI | 0.51 | 1.9 | | | |
| | 61 | C6FMA | 21.40 | 46.6 | LA | 12.08 | 47.3 | HEA | 0.52 | 4.2 | 35DPBI | 0.52 | 1.9 | | | |
| | 62 | C6FMA | 21.40 | 46.6 | LA | 12.08 | 47.3 | HEA | 0.52 | 4.2 | 35DPBI | 0.52 | 1.9 | | | |
| | 63 | C6FMA | 21.40 | 46.6 | LA | 12.08 | 47.3 | HEA | 0.52 | 4.2 | 35DPBI | 0.52 | 1.9 | | | |
| | 64 | C6FMA | 21.28 | 46.6 | LA | 12.02 | 47.3 | HEA | 0.51 | 4.2 | 35DPBI | 0.51 | 1.9 | | | |
| | 65 | C6FMA | 21.27 | 46.6 | LA | 12.02 | 47.3 | HEMA | 0.51 | 4.2 | 35DPBI | 0.51 | 1.9 | | | |
| | 66 | C6FMA | 21.27 | 46.6 | LA | 12.00 | 47.3 | 4HBA | 0.51 | 4.2 | 35DPBI | 0.51 | 1.9 | | | |
| Comp. Ex | 38 | C6FA | 19.87 | 42.6 | | | | HEA | 1.06 | 9.5 | BOIPBI | 1.18 | 2.3 | 2EHA | 8.95 | 45.6 |
| | 39 | C6FMA | 21.41 | 55.1 | | | | HEA | 0.45 | 4.3 | 35DPBI | 0.45 | 2.0 | iDMA | 7.84 | 38.5 |
| | 40 | C6FMA | 20.80 | 55.3 | | | | HEA | 0.45 | 4.5 | 35DPBI | 0.45 | 2.1 | LMA | 8.44 | 38.1 |
| | 41 | C6FMA | 33.27 | 92.2 | | | | 4HBA | 0.51 | 5.3 | 35DPBI | 0.51 | 2.2 | | | |
| | 42 | C6FMA | 21.61 | 48.7 | LA | 12.18 | 49.3 | | | | 35DPBI | 0.51 | 2.0 | | | |
| | 43 | C6FMA | 21.61 | 47.6 | LA | 12.18 | 48.2 | 4HBA | 0.51 | 4.2 | | | | | | |

TABLE 6

| | Ex. No | Surfactant | | | | | | Deionized water Mass (g) | Organic solvent | | Molecular weight-controlling agent | | Polymerization initiator | | Solid content concentration (%) | Mass average molecular weight (Mw) |
|---|---|---|---|---|---|---|---|---|---|---|---|---|---|---|---|---|
| | | Compound code | Mass (g) | Compound code | Mass (g) | Compound code | Mass (g) | | Compound code | Mass (g) | Compound code | Mass (g) | Compound code | Mass (g) | | |
| Ex. | 46 | BT-15 | 2.96 | AQ-2HT | 0.59 | | | 53.75 | PG | 11.85 | StSH | 0.09 | Ini-A | 0.61 | 30.3 | |
| | 47 | BT-15 | 2.96 | AQ-2HT | 0.59 | | | 53.75 | PG | 11.85 | StSH | 0.09 | Ini-A | 0.61 | 26.9 | |
| | 48 | BT-15 | 2.96 | AQ-2HT | 0.59 | | | 53.75 | PG | 11.85 | StSH | 0.09 | InhA | 0.61 | 29.3 | |
| | 49 | BT-15 | 2.96 | AQ-2HT | 0.59 | | | 53.75 | PG | 11.85 | StSH | 0.09 | Ini-A | 0.61 | 27.7 | |
| | 50 | BT-15 | 2.96 | AQ-2HT | 0.59 | | | 53.76 | PG | 11.85 | StSH | 0.09 | Ini-A | 0.61 | 18.2 | 333,000 |
| | 51 | BT-15 | 2.96 | AQ-2HT | 0.59 | | | 53.75 | PG | 11.85 | StSH | 0.09 | Ini-A | 0.61 | 29.0 | |
| | 52 | BT-15 | 2.96 | AQ-2HT | 0.59 | | | 53.75 | PG | 11.85 | StSH | 0.09 | Ini-A | 0.61 | 30.0 | |
| | 53 | BT-15 | 2.96 | AQ-2HT | 0.59 | | | 53.76 | PG | 11.85 | StSH | 0.09 | Ini-A | 0.61 | 28.7 | |
| | 54 | BT-15 | 2.96 | AQ-2HT | 0.59 | | | 53.76 | PG | 11.85 | StSH | 0.09 | Ini-A | 0.61 | 29.9 | |
| | 55 | BT-15 | 3.63 | AQ-2HT | 0.72 | | | 41.34 | PG | 14.54 | DoSH | 0.04 | Ini-A | 0.75 | 33.4 | 291,000 |
| | 56 | BT-15 | 3.63 | AQ-2HT | 0.72 | | | 43.33 | PG | 14.53 | DoSH | 0.07 | Ini-A | 0.75 | 36.5 | 190,000 |
| | 57 | BT-15 | 3.63 | AQ-2HT | 0.72 | | | 43.31 | PG | 14.53 | DoSH | 0.09 | Ini-A | 0.75 | 34.7 | 137.000 |
| | 58 | BT-15 | 3.53 | AQ-2HT | 0.35 | | | 36.26 | PG | 14.12 | DoSH | 0.07 | Ini-A | 0.73 | 33.3 | 159,000 |
| | 59 | BT-15 | 3.53 | | | | | 45.44 | PG | 14.17 | DoSH | 0.07 | InhA | 0.73 | 33.7 | 151.000 |
| | 60 | E-430 | 1.71 | AQ-18 | 0.34 | P-204 | 0.34 | 52.40 | DPG | 10.26 | DoSH | 0.07 | Ini-A | 0.69 | 31.2 | 142,000 |
| | 61 | BT-15 | 1.21 | AQ-18 | 0.24 | | | 52.90 | DPG | 10.36 | DoSH | 0.07 | Ini-A | 0.70 | 31.2 | 157,000 |
| | 62 | E-430 | 1.21 | AQ-18 | 0.24 | | | 52.90 | DPG | 10.36 | DoSH | 0.07 | InhA | 0.70 | 31.0 | 114,000 |
| | 63 | SFY465 | 1.21 | AQ-18 | 0.24 | | | 52.90 | DPG | 10.36 | DoSH | 0.07 | Ini-A | 0.70 | 30.6 | 163,000 |
| | 64 | E-430 | 1.72 | AQ-18 | 0.34 | | | 52.54 | PG | 10.29 | DoSH | 0.09 | Ini-B | 0.72 | 33.7 | 187.000 |
| | 65 | E-430 | 1.72 | AQ-18 | 0.34 | | | 52.54 | PG | 10.29 | DoSH | 0.09 | Ini-B | 0.72 | 32.2 | 161,000 |
| | 66 | E-430 | 1.72 | AQ-18 | 0.34 | | | 52.54 | PG | 10.29 | DoSH | 0.09 | Ini-B | 0.72 | 34.9 | 193,000 |
| Comp. Ex. | 38 | BT-15 | 2.96 | AQ-2HT | 0.59 | | | 61.79 | PG | 11.85 | StSH | 0.09 | Ini-A | 0.61 | 28.4 | |
| | 39 | BT-15 | 2.96 | AQ-2HT | 0.59 | | | 61.59 | PG | 11.85 | StSH | 0.09 | Ini-A | 0.61 | 29.3 | |
| | 40 | BT-15 | 2.96 | AQ-2HT | 0.59 | | | 62.20 | PG | 11.85 | StSH | 0.09 | Ini-A | 0.61 | 29.0 | |
| | 41 | E-430 | 1.72 | AQ-18 | 0.34 | | | 52.54 | PG | 10.29 | DoSH | 0.09 | Ini-B | 0.72 | 33.6 | 185,000 |
| | 42 | E-430 | 1.72 | AQ-18 | 0.34 | | | 52.54 | PG | 10.29 | DoSH | 0.09 | Ini-B | 0.72 | 34.7 | 152,000 |
| | 43 | E-430 | 1.72 | AQ-18 | 0.34 | | | 52.54 | PG | 10.29 | DoSH | 0.09 | Ini-B | 0.72 | 33.4 | 125,000 |

The mol % of each monomer component in Table 5 represents the mol percentage (%) in all monomers (100 mol %).

Further, the compound codes in Tables 5 and 6 have the following meanings. Here, among the compound codes in Table 5, with respect to the same ones as the codes used in Tables 1 and 2, reference should be made to the description of the codes for the above Tables 1 and 2 (irrespective of the classification of the monomers, the same codes are used for the same compounds).

Monomer (A):
  C6FA: $C_6F_{13}C_2H_4OCOCH=CH_2$ monomer (A1)
  C6FMA: $C_6F_{13}C_2H_4OCOC(CH_3)=CH_2$ monomer (A2)
Monomer (C2):
  BOIPBI: 3-(Methylethylketoxime)isocyanatomethyl-3,5,5-trimethylcyclohexyl-(2-hydroxyethyl methacrylate) isocyanate
Surfactant:
  BT-15: Polyoxyethylene secondary alkyl ether (NIKKOL BT-15, ethylene oxide about 15 mol adduct, manufactured by Nikko Chemicals Co., Ltd.)
  AQ-2HT: Dialkylammonium chloride (Argued 2HT, manufactured by LION K.K.)
  E-430: Polyoxyethyleneoleyl ether (EMULGEN E430, ethylene oxide about 26 mol adduct, manufactured by Kao Corporation)
  AQ-18: Stearyltrimethylammonium chloride (Arquad 18-63, manufactured by LION K.K.)
  P-204: Ethylene oxide propylene oxide polymer (PLONON 204, proportion of ethylene oxide: 40 mass %, manufactured by NOF CORPORATION)
  SYF465: 2,4,7,9-Tetramethyl-5-decyne-4,7-diol-ethylene oxide adduct (SURFYNOL 465, ethylene oxide about 10 mol adduct, manufactured by NISSIN CHEMICAL INDUSTRY CO., LTD.)
Organic Solvent:
  PG: Propylene glycol
  DPG: Dipropylene glycol
Molecular Weight-Controlling Agent:
  StSH: Stearyl mercaptan
  DoSH: n-Dodecyl mercaptan
Polymerization Initiator:
  Ini-A: 10 mass % aqueous solution of (2,2'-azobis[2-(2-imidazolin-2-yl)propane]disulfate dihydrate (VA-046B, manufactured by Wako Pure Chemical Industries, Ltd.)
  Ini-B: 10 mass % aqueous solution of an acetate of (2,2'-azobis[2-(2-imidazolin-2-yl)propane] (VA-061 manufactured by Wako Pure Chemical Industries, Ltd.)

<Evaluation 1>

With respect to each of the emulsions obtained in the above Examples 46 to 66 and Comparative Examples 38 to 43, a test cloth A was prepared, and the water repellency, the oil repellency and the gasoline repellency were evaluated by the following methods.

The results are shown in Table 9.

[Preparation of Test Cloth]

The obtained emulsion was diluted with deionized water so that the solid content concentration became 2.4 mass %, and further, a trimethylol melamine resin (tradename: "Sumitex Resin M-3" manufactured by Sumitomo Chemical Co., Ltd.) and, as a thermosetting catalyst, an organic amine salt catalyst (tradename: "Sumitex Accelerator ACX" manufactured by Sumitomo Chemical Co., Ltd.) were added so that each became 0.3 mass %, to obtain a test liquid A. A cotton twill or meta-aramid cloth was dipped in such a test liquid A and squeezed so that the wet pickup became 90 mass % or 70 mass %. It was dried at 110° C. for 90 seconds and then dried at 170° C. for 60 seconds to obtain a test cloth A.

[Evaluation of Water Repellency]

In accordance with AATCC-TM118-1966, each of the isopropyl alcohol (IPA) aqueous solutions shown in Table 7 was placed (diameter: about 4 mm) on the test cloth A prepared as described above, and the water repellency was represented by the highest water repellency grade (as shown in Table 7) where no wettability was observed for 2 minutes. The larger the numerical value, the better the water repellency. Here, the water repellency grade followed by +(−) indicates that such an evaluation is slightly higher (lower).

TABLE 7

| Water repellency grades | Test solutions (mass %) |
|---|---|
| 12 | IPA |
| 11 | IPA 90/water 10 |
| 10 | IPA 80/water 20 |
| 9 | IPA 70/water 30 |
| 8 | IPA 60/water 40 |
| 7 | IPA 50/water 50 |
| 6 | IPA 40/water 60 |
| 5 | IPA 30/water 70 |
| 4 | IPA 20/water 80 |
| 3 | IPA 10/water 90 |
| 2 | IPA 5/water 95 |
| 1 | IPA 2/water 98 |
| 0 | Lower than 1 |

[Evaluation of Oil Repellency]

In accordance with the test method of AATCC-TM118-1966, each of the test solutions shown in Table 8 was placed in the form of droplets (diameter: about 4 mm) at two portions on the test cloth A prepared as described above, and the oil repellency was represented by the oil repellency grade shown in Table 8 depending upon the soaked state after 30 seconds. Here, the oil repellency grade followed by +(−) indicates that such an evaluation is slightly higher (lower).

TABLE 8

| Oil repellency grades | Test solutions | Surface tension mN/m (25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of Nujol/35 parts by hexadecane | 29.6 |
| 1 | Nujol | 31.2 |
| 0 | Lower than 1 | — |

[Evaluation of Gasoline Repellency]

In accordance with BS EN368: 1993 "Gutter Test"—Protective clothing. Protection against liquid chemicals, a predetermined amount of gasoline was permitted to flow on the test cloth A set on a measuring apparatus, whereby the amount of gasoline recovered without deposition on or penetration in the test cloth A was measured, and the recovery rate was calculated to evaluate the gasoline repellency. The higher the recovery rate of gasoline, the better the gasoline repellency.

As a Reference Example, evaluation of the water repellency, oil repellency and gasoline repellency was carried out by using an oil repellent composition AG-3700 (manufactured by Asahi Glass Company, Limited) containing, as an effective component, a copolymer containing polymerized units having an $R^F$ group having at least 8 carbon atoms, although it is excellent in gasoline repellency. The results are shown in the last row in Table 9.

TABLE 9

| | | Cotton twill | | | Aramid | | |
|---|---|---|---|---|---|---|---|
| | Ex. No | Water repellency | Oil repellency | Gasoline repellency (Gasoline recovery rate) | Water repellency | Oil repellency | Gasoline repellency (Gasoline recovery rate) |
| Example | 46 | 12 | 7 | 81.5% | | | |
| | 47 | 12 | 6+ | 82.6% | | | |
| | 48 | 12− | 7− | 70.5% | | | |
| | 49 | 12 | 7 | 88.8% | | | |
| | 50 | 12 | 7 | 85.0% | | | |
| | 51 | 12 | 7 | 88.1% | | | |
| | 52 | 12− | 7 | 84.6% | | | |
| | 53 | 12 | 7 | 80.6% | | | |
| | 54 | 12− | 7 | 87.1% | | | |
| | 55 | 12 | 7 | 82.1% | | | |
| | 56 | 12 | 7 | 88.0% | 12− | 7− | 86.6% |
| | 57 | 12− | 7 | 76.9% | | | |
| | 58 | 12 | 7 | 87.9% | 12 | 7 | 84.4% |
| | 59 | 12 | 7− | 72.0% | 12− | 7 | 84.0% |
| | 60 | 12 | 7 | 82.6% | | | |
| | 61 | 12 | 7− | 86.6% | 12 | 7− | 85.6% |
| | 62 | 12− | 7 | 86.3% | 12− | 7 | 85.3% |
| | 63 | 12 | 7− | 90.0% | 12 | 7− | 86.8% |
| | 64 | 12 | 7 | 87.2% | 12 | 7 | 83.4% |
| | 65 | 12 | 7 | 85.8% | 12− | 7− | 81.3% |
| | 66 | 12 | 7 | 87.3% | 12 | 7 | 85.4% |
| Comparative Example | 38 | 12− | 6− | 9.5% | | | |
| | 39 | 12 | 6+ | 38.1% | | | |
| | 40 | 12 | 6 | 43.0% | | | |
| | 41 | 10 | 6+ | 0.0% | | | |
| | 42 | 12 | 7 | 84.8% | | | |
| | 43 | 12 | 7− | 78.1% | | | |
| Reference Example (AG-3700) | | 12 | 7+ | 88.6% | 12 | 7+ | 82.6% |

<Evaluation 2>

With respect to each of emulsions of the copolymers obtained in the above Examples 56, 66 and Comparative Examples 41 to 43, a test cloth B was prepared, and the washing durability of the water repellency, oil repellency and gasoline repellency was evaluated by the following methods. The results are shown in Table 10.

[Preparation of Test Cloth]

The emulsion of the copolymer obtained as described above, was diluted with distilled water to adjust the solid content concentration to be 4.0 mass %, and then, as a thermosetting agent, a trimethylol melamine resin (BECKAMINE M-3, manufactured by Dainippon Ink and Chemicals, Incorporated) and, as a thermosetting catalyst, an organic amine salt catalyst (CATALYST ACX manufactured by Dainippon Ink and Chemicals, Incorporated) were added so that each concentration became 0.3 mass %, and further, a blocked isocyanate (MEIKANATE TP-10, manufactured by Meisei Chemical Works, Ltd.) was added so that its concentration became 1.0 mass %, to obtain an oil repellent composition.

Cotton twill was dipped in the oil repellent composition and squeezed so that the wet pickup became 90 mass %. It was dried at 110° C. for 90 seconds and then dried at 170° C. for 60 seconds to obtain a test cloth B.

[Evaluation of Water Repellency]

In accordance with AATCC-TM118-1966, each of isopropyl alcohol (IPA) aqueous solutions shown in Table 7 was placed (diameter: about 4 mm) on the test cloth B prepared as described above, and the water repellency was represented by the highest water repellency degree (as shown in Table 7) where no wettability was observed for 3 minutes. The larger the numerical value, the better the water repellency. Here, the water repellency degree followed by +(−) indicates the such an evaluation is slightly higher (lower). The results are shown as initial measuring results in Table 10.

[Evaluation of Oil Repellency]

With respect to the test cloth B, the oil repellency was evaluated in accordance with the test method of AATCC-TM118-1966. The oil repellency was represented by the oil repellency grade shown in Table 8. Here, the oil repellency grade followed by +(−) indicates that such an evaluation is slightly higher (lower). The results are shown as the initial measurement results in Table 10.

[Evaluation of Gasoline Repellency]

With respect to the test cloth B, in accordance with BS EN368: 1993 "Gutter Test"-Protective clothing. Protection against liquid chemicals, the recovery rate of gasoline was measured, and evaluation of the gasoline repellency was carried out in the same method as in the above evaluation 1. The results are shown as the initial measurement results in Table 10.

[Washing Durability]

With respect to the test cloth B, washing was repeated twenty times in accordance with the washing method of JIS-L0217 Attached Table 103, followed by air drying and then by heat treatment at 160° C. for 15 seconds by means of a drum dryer, whereupon the water repellency, oil repellency and gasoline repellency were evaluated by the above methods. The results are shown as washing durability test results in Table 10.

TABLE 10

| | Initial measurement results | | | Results of measurement after washing 20 times (Washing durability test results) | | |
|---|---|---|---|---|---|---|
| | Water repellency | Oil repellency | Gasoline repellency (recovery rate) | Water repellency | Oil repellency | Gasoline repellency (recovery rate) |
| Ex. 56 | 12 | 7 | 86.8% | 12 | 7 | 79.9% |
| Ex. 66 | 12 | 7 | 88.1% | 12 | 7 | 82.5% |
| Comp. Ex. 41 | 10 | 6+ | 0.0% | — | — | — |
| Comp. Ex. 42 | 12 | 7 | 83.5% | 12 | 7− | 70.4% |
| Comp. Ex. 43 | 12 | 7− | 79.2% | 11 | 7− | 46.0% |

From these results, it is evident that when an article is treated with an oil repellent composition containing the copolymer of the present invention, particularly the copolymer having a mass average molecular weight within a preferred range, oil repellency, particularly high oil repellency against an oil having a low surface tension such as gasoline, can be imparted as compared with an oil repellent composition containing a copolymer of a Comparative Example not containing one of the constituting components of the copolymer of the present invention. Further, in the gasoline repellency, it is substantially equal to the oil repellent composition AG-3700 containing, as an active component, a copolymer containing polymerized units having an $R^F$ group having at least 8 carbon atoms, which has a high environmental burden.

Further, when the oil repellent composition containing the copolymer of the present invention is used, it is possible to impart not only oil repellency but also water repellency to an article, and while the durability of the water and oil repellency is sufficient, it presents little environmental burden.

Industrial Applicability

The copolymer of the present invention and the oil repellent composition containing it are useful, in place of a copolymer having $R^F$ groups with at least 8 carbon atoms which has high environmental burden, in the fields wherein high oil repellency is required against oils having low surface tensions such as gasoline, e.g. in the fields of automobile related products, fiber products such as fire-fighting clothing, antiriot squad clothing or chemical protection suits, etc.

The entire disclosure of Japanese Patent Application No. 2008-145056 filed on Jun. 2, 2008 including specification, claims and summary is incorporated herein by reference in its entirety.

What is claimed is:

1. A copolymer comprising the following polymerized units (a), polymerized units (b), polymerized units (c2) and 1 to 6 mol % based on all monomers of polymerized units (c1):

polymerized units (a): polymerized units based on a monomer represented by the following formula (1):

$$Z—Y—X \quad (1)$$

in the formula (1), Z is a $C_{4-6}$ polyfluoroalkyl group or a group represented by the following formula (2), Y is a bivalent organic group or a single bond, and X is any one of groups represented by the following formulae (3-1) to (3-5):

$$C_iF_{2i+1}O(CFX^1CF_2O)_jCFX^2— \quad (2)$$

wherein i is an integer of from 1 to 6, j is an integer of from 0 to 10, and each of $X^1$ and $X^2$ is a fluorine atom or a trifluoromethyl group, $$—CR═CH_2 \quad (3\text{-}1)$$

$$—C(O)OCR═CH_2 \quad (3\text{-}2)$$

$$—OC(O)CR═CH_2 \quad (3\text{-}3)$$

$$—OCH_2\text{-}\phi\text{-}CR═CH_2 \quad (3\text{-}4)$$

$$—OCH═CH_2 \quad (3\text{-}5)$$

wherein R is a hydrogen atom, a methyl group or a halogen atom, and φ is a phenylene group, polymerized units (b): polymerized units based on a linear or branched alkyl (meth)acrylate wherein the alkyl moiety has from 6 to 18 carbon atoms, provided that when in the polymerized units (a), X in the formula (1) is a group represented by any one of the formulae (3-1) to (3-4) wherein R is a group being a methyl group or a halogen atom, the polymerized units (b) are polymerized units based on an alkyl acrylate, and when in the polymerized units (a), X in the formula (1) is a group represented by any one of the formulae (3-1) to (3-4) wherein R is a group being a hydrogen atom, or a group represented by the formula (3-5), the polymerized units (b) are polymerized units based on an alkyl methacrylate, polymerized units (c1): polymerized units based on a monomer having a hydroxy group without having a polyfluoroalkyl group, and polymerized units (c2): polymerized units based on a monomer having a functional group which is reactive with the hydroxy group in the polymerized units (c1) to form a crosslinked structure.

2. The copolymer according to claim 1, wherein the polymerized units (c2) are polymerized units based on a monomer having an isocyanate group or a blocked isocyanate group.

3. The copolymer according to claim 1, wherein, based on all polymerized units constituting the copolymer, the polymerized units (a) are from 40 to 85 mol %, the polymerized units (b) are from 10 to 55 mol %, and the total of the polymerized units (a) and the polymerized units (b) is at least 70 mol %.

4. The copolymer according to claim 1, wherein, based on all polymerized units constituting the copolymer, the polymerized units (c2) are from 0.1 to 5 mol %.

5. The copolymer according to claim 1, wherein the polymerized units (a) are the following polymerized units (a1), and the polymerized units (b) are the following polymerized units (b1); and based on all polymerized units constituting the copolymer, the polymerized units (a1) are from 45 to 85 mol %, the polymerized units (b1) are from 10 to 50 mol %, and the total of the polymerized units (a1) and the polymerized units (b 1) is at least 70 mol %:

polymerized units (a1): polymerized units based on $C_6F_{13}C_2H_4OCOCH=CH_2$, and polymerized units (b 1): polymerized units based on a linear or branched alkyl methacrylate wherein the alkyl moiety has from 6 to 10 carbon atoms.

6. The copolymer according to claim 1, wherein the polymerized units (a) are the following polymerized units (a2), and the polymerized units (b) are the following polymerized units (b2); and based on all polymerized units constituting the copolymer, the polymerized units (a2) are from 40 to 70 mol %, the polymerized units (b2) are from 25 to 55 mol %, and the total of the polymerized units (a2) and the polymerized units (b2) is at least 70 mol %:

polymerized units (a2): polymerized units based on $C_6F_{13}C_2H_4OCOC(CH_3)=CH_2$, and polymerized units (b2): polymerized units based on a linear or branched alkyl acrylate wherein the alkyl moiety has from 8 to 18 carbon atoms.

7. The copolymer according to claim 1, wherein the mass average molecular weight of the copolymer is from 100,000 to 500,000.

8. An oil repellent composition comprising the copolymer as defined in claim 1 and a medium.

9. An article treated with the oil repellent composition as defined in claim 8.

10. A method for producing a copolymer, which comprises polymerizing a monomer mixture comprising the following monomer (A), monomer (B), monomer (C1) and monomer (C2) in a medium in the presence of a polymerization initiator, to form a copolymer wherein, based on all monomers 100 mol %, the monomer (A) is from 40 to 85 mol %, the monomer (B) is from 10 to 55 mol %, the monomer (C1) is from 1 to 6 mol % and the total of the monomer (A) and the monomer (B) is at least 70 mol %:

monomer (A): a monomer represented by the following formula (1):

$$Z-Y-X \tag{1}$$

in the formula (1), Z is a $C_{4-6}$ polyfluoroalkyl group or a group represented by the following formula (2), Y is a bivalent organic group or a single bond, and X is any one of groups represented by the following formulae (3-1) to (3-5):

$$C_iF_{2i+1}O(CFX^1CF_2O)_jCFX^2- \tag{2}$$

wherein i is an integer of from 1 to 6, j is an integer of from 0 to 10, and each of $X^1$ and $X^2$ is a fluorine atom or a trifluoromethyl group, $$-CR=CH_2 \tag{3-1}$$

$$-C(O)OCR=CH_2 \tag{3-2}$$

$$-OC(O)CR=CH_2 \tag{3-3}$$

$$-OCH_2\text{-}\phi\text{-}CR=CH_2 \tag{3-4}$$

$$-OCH=CH_2 \tag{3-5}$$

wherein R is a hydrogen atom, a methyl group or a halogen atom, and φ is a phenylene group, monomer (B): a linear or branched alkyl (meth)acrylate wherein the alkyl moiety has from 6 to 18 carbon atoms, provided that when in the monomer (A), X in the formula (1) is a group represented by any one of the formulae (3-1) to (3-4) wherein R is a group being a methyl group or a halogen atom, the monomer (B) is an alkyl acrylate, and when in the monomer (A), X in the formula (1) is a group represented by any one of the formulae (3-1) to (3-4) wherein R is a group being a hydrogen atom, or a group represented by the formula (3-5), the monomer (B) is an alkyl methacrylate, monomer (C 1): a monomer having a hydroxy group without having a polyfluoroalkyl group, and monomer (C2): a monomer having a functional group which is reactive with the hydroxy group in the monomer (C1) to form a crosslinked structure.

11. A method for producing a copolymer, which comprises polymerizing a monomer mixture comprising the following monomer (A), monomer (B), monomer (C1) and monomer (C2) in a medium containing water in the presence of a surfactant and a polymerization initiator, to form a copolymer wherein, based on all monomers 100 mol %, the monomer (A) is from 40 to 85 mol %, the monomer (B) is from 10 to 55 mol %, the monomer (C1) is from 1 to 6 mol % and the total of the monomer (A) and the monomer (B) is at least 70 mol %:

monomer (A): a monomer represented by the following formula (1):

$$Z-Y-X \tag{1}$$

in the formula (1), Z is a $C_{4-6}$ polyfluoroalkyl group or a group represented by the following formula (2), Y is a bivalent organic group or a single bond, and X is any one of groups represented by the following formulae (3-1) to (3-5):

$$C_iF_{2i+1}O(CFX^1CF_2O)_jCFX^2- \tag{2}$$

wherein i is an integer of from 1 to 6, j is an integer of from 0 to 10, and each of $X^1$ and $X^2$ is a fluorine atom or a trifluoromethyl group, $$-CR=CH_2 \tag{3-1}$$

$$-C(O)OCR=CH_2 \tag{3-2}$$

$$-OC(O)CR=CH_2 \tag{3-3}$$

$$-OCH_2\text{-}\phi\text{-}CR=CH_2 \tag{3-4}$$

$$-OCH=CH_2 \tag{3-5}$$

wherein R is a hydrogen atom, a methyl group or a halogen atom, and φ is a phenylene group, monomer (B): a linear or branched alkyl (meth)acrylate wherein the alkyl moiety has from 6 to 18 carbon atoms, provided that when in the monomer (A), X in the formula (1) is a group represented by any one of the formulae (3-1) to (3-4) wherein R is a group being a methyl group or a halogen atom, the monomer (B) is an alkyl acrylate, and when in the monomer (A), X in the formula (1) is a group represented by any one of the formulae (3-1) to (3-4) wherein R is a group being a hydrogen atom, or a group represented by the formula (3-5), the monomer (B) is an alkyl methacrylate, monomer (C1): a monomer having a hydroxy group without having a polyfluoroalkyl group, and monomer (C2): a monomer having a functional group which is reactive with the hydroxy group in the monomer (C1) to form a crosslinked structure.

\* \* \* \* \*